(12) United States Patent
Kira et al.

(10) Patent No.: US 9,376,266 B2
(45) Date of Patent: Jun. 28, 2016

(54) NUT ARRANGING APPARATUS

(75) Inventors: Kazuhiko Kira, Toyota (JP); Toshio Toyoda, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 187 days.

(21) Appl. No.: 14/131,618

(22) PCT Filed: Jul. 10, 2012

(86) PCT No.: PCT/IB2012/001353
§ 371 (c)(1),
(2), (4) Date: Jan. 8, 2014

(87) PCT Pub. No.: WO2013/008078
PCT Pub. Date: Jan. 17, 2013

(65) Prior Publication Data
US 2014/0140802 A1    May 22, 2014

(30) Foreign Application Priority Data

Jul. 14, 2011    (JP) ................. 2011-156099

(51) Int. Cl.
*B65G 47/14* (2006.01)
*B65G 47/24* (2006.01)
*B23P 19/06* (2006.01)
(Continued)

(52) U.S. Cl.
CPC ............... *B65G 47/14* (2013.01); *B23P 19/002* (2013.01);
(Continued)

(58) Field of Classification Search
CPC ........... B07C 2501/0009; B23P 19/001; B23P 19/002; B23P 19/003; B23P 19/004; B23P 19/006; B23P 19/069; B65G 47/14; B65G 47/1407; B65G 47/1428; B65G 47/1442; B65G 47/1457; B65G 47/24; B65G 47/256; B65G 47/82; B25B 23/08; B25B 23/10; B25B 23/12
See application file for complete search history.

(56) References Cited

U.S. PATENT DOCUMENTS 6,116,406 A * 9/2000 Marti Sala ......... B65G 47/1457
198/395

(Continued)

FOREIGN PATENT DOCUMENTS

| JP | 2006-205274 A | 8/2006 |
|---|---|---|
| JP | 2007-055787 A | 3/2007 |
| JP | 2009-263091 A | 11/2009 |
| JP | 2010-042928 A | 2/2010 |

*Primary Examiner* — Ryan J Walters
*Assistant Examiner* — Matthew P Travers
(74) *Attorney, Agent, or Firm* — Sughrue Mion, PLLC

(57) ABSTRACT

A nut arranging apparatus includes a nut arranging portion having a generally ring-shaped shape for arranging nuts, and a nut supplying portion that is a portion for supplying the nuts to the nut arranging portion and is arranged inside the nut arranging portion. The nut supplying portion includes a holding portion that is a portion for temporarily holding the nuts. The nut supplying portion forms a bottom plate portion that is a bottom surface portion of the holding portion with a surface that is inclined with respect to a horizontal direction, and changes a direction of tilt of the bottom plate portion. The nut supplying portion supplies the nuts to an appropriate position of the nut arranging portion by sliding the nuts held in the holding portion in the direction of tilt of the bottom plate portion while changing the direction of tilt of the bottom plate portion.

12 Claims, 28 Drawing Sheets

(51) Int. Cl.
*B23P 19/00* (2006.01)
*B65G 47/82* (2006.01)
*B25B 23/12* (2006.01)

(52) U.S. Cl.
CPC ............. *B23P 19/004* (2013.01); *B23P 19/006* (2013.01); *B23P 19/069* (2013.01); *B65G 47/24* (2013.01); *B25B 23/12* (2013.01); *B65G 47/1428* (2013.01); *B65G 47/82* (2013.01)

(56) References Cited

U.S. PATENT DOCUMENTS 7,472,782 B2    1/2009  Corbin
7,857,162 B2 *  12/2010 Minami ................. B65B 5/103
                                                        221/119
2007/0240968 A1 10/2007 Corbin \* cited by examiner

H > W

NUT ARRANGING APPARATUS

INCORPORATION BY REFERENCE

The disclosure of Japanese Patent Application No. 2011-156099 filed on Jul. 14, 2011, including the specification, drawings and abstract is incorporated herein by reference in its entirety.

BACKGROUND OF THE INVENTION

1. Field of the Invention

The invention relates to technology of a nut arranging apparatus that is an apparatus for arranging nuts in a multi-axis temporary tightening tool.

2. Description of Related Art

There are cases in which a work that is an object of assembly is fixed to a portion to which the work is to be assembled, using a plurality of screwing members (such as nuts and bolts), as is the case when fastening a wheel of a tire to a hub using a plurality of nuts. For example, in the work of fixing a wheel to a hub using nuts, when tightening the nuts, a worker typically first screws the nuts by hand, one at a time, by only a few threads onto stud bolts that are implanted in the hub, and then performs the final tightening of the nuts at a predetermined torque using a tool such as a torque wrench. In the main description below, screwing together a screwing member such as a nut or a bolt to a screwable member such as a stud bolt or a nut by only a few threads before final tightening will be referred to as "temporary tightening".

However, if a worker temporarily tightens the nuts by hand one at a time, it takes time and is laborious, so a tool (a so-called multi-axis temporary tightening tool) capable of temporarily tightening a plurality of nuts simultaneously has been developed in order to perform temporary tightening work efficiently. For example, the technology described in Japanese Patent Application Publication No. 2006-205274 (JP 2006-205274 A) that will be described below is well known. The term "multi-axis temporary tightening tool" referred to here is a tool suited for the use of simultaneously "temporarily tightening" a plurality of screwing members (such as bolts and nuts), but the use is not limited to temporarily tightening screwing members. For example, when there is little need for torque control, the multi-axis temporary tightening tool may also be used to simultaneously final-tighten a plurality of screwing members, or may be used to simultaneously loosen a plurality of screwing members that are fastened together, or the like.

The multi-axis temporary tightening tool according to the related art described in JP 2006-205274 A includes a driving gear that rotates by driving means, a plurality of driven gears, a toothed belt that is wound around the driving gear and the plurality of driven gears and transmits the rotation of the driving gear to the plurality of driven gears, and a plurality of sockets that are connected to the plurality of driven gears and engage with bolts or nuts. The driving gear is arranged in the center of a main body portion of the multi-axis temporary tightening tool, and the plurality of driven gears and sockets are arranged around the driving gear in the main body portion. With this kind of structure, the plurality of sockets are able to be simultaneously rotatably driven, thus making it possible to temporarily tighten the plurality of bolts or nuts or the like simultaneously, by inputting rotary force to the driving gear.

However, when temporarily tightening nuts using the multi-axis temporary tightening tool according to the related art described in JP 2006-205274 A, the nuts must be arranged beforehand in each of the plurality of sockets. Conventionally, a worker manually arranges the nuts in the sockets, so the work of temporary tightening takes time and is laborious.

Also conventionally, an apparatus for adjusting the postures of the nuts or the like and supplying the nuts or the like to a desired position has been developed. For example, the technology described in Japanese Patent Application Publication No. 2007-55787 (JP 2007-55787 A) that will be described below is well known. With the supplying apparatus (i.e., a thin plate-shaped work separating and removing apparatus) for nuts or the like according to the related art described in JP 2007-55787 A, an inclined bottom surface is provided in a hopper, and a separation chute that can be raised and lowered is provided adjacent to the lowest portion of the bottom surface. By raising and lowering the separation chute, an individual thin plate-shaped work is engaged and sequentially transferred from the hopper by its own weight through the separation chute and a fixed chute. This kind of supply apparatus for nuts or the like is able to separate and remove thin plate-shaped works one by one with a simple structure. Moreover, the hopper is not vibrated nor is the thin plate-shaped work swept up by a scraper, so noise from vibration and the like is suppressed, which improves the work environment. In addition, the thin plate-shaped work is able to be prevented from being damaged.

However, it is difficult to use a supply apparatus for nuts or the like according to related art, such as the supply apparatus described in JP 2007-55787 A, for the purpose of arranging nuts in positions corresponding to the sockets of a multi-axis temporary tightening tool. Also, an apparatus capable of efficiently arranging nuts in positions corresponding to the sockets does not exist, so when using a conventional multi-axis temporary tightening tool, a worker must arrange the nuts in the sockets by hand, and as a result, temporary tightening work takes time and is laborious.

SUMMARY OF THE INVENTION

In view of the foregoing problems, the invention provides a nut arranging apparatus capable of efficiently arranging nuts in positions corresponding to sockets of a multi-axis temporary tightening tool.

A first aspect of the invention relates to a nut arranging apparatus that includes a nut arranging portion that has a generally ring-shaped shape and is a portion for arranging nuts, and a nut supplying portion that is a portion for supplying the nuts to the nut arranging portion and is arranged inside the nut arranging portion. The nut supplying portion includes a holding portion that is a portion for temporarily holding the nuts. The nut supplying portion is configured to form a bottom surface portion of the holding portion with a surface that is inclined with respect to a horizontal direction, and be able to change a direction of tilt of the bottom surface portion to an appropriate radial direction. The nut supplying portion is configured to supply the nuts to an appropriate position of the nut arranging portion by sliding the nuts that are held in the holding portion in the direction of tilt of the bottom surface portion while changing the direction of tilt of the bottom surface portion to an appropriate radial direction.

With this nut arranging apparatus, a nut arranging apparatus capable of arranging nuts corresponding to socket portions of a multi-axis temporary tightening tool can be realized by a simple structure.

Also, in the nut arranging apparatus described above, the holding portion may include a cylindrical portion that is a generally cylindrical portion that is inclined with respect to a vertical direction and in which a lower end portion thereof is blocked off by the bottom surface portion, a nut discharging port that is an open portion for discharging the nuts from the holding portion and is formed in the lower end portion of the cylindrical portion, and a generally ring-shaped inclined portion that is a surface that is inclined with respect to a horizontal direction and is continuous from the outside of the cylindrical portion to just before the nut arranging portion. Also, the holding portion may be configured to supply the nuts to an appropriate position of the nut arranging portion by discharging the nuts held in the holding portion in an appropriate radial direction from the nut discharging port toward the inclined portion by sliding the nuts held in the holding portion in the direction of tilt of the bottom surface portion while changing the direction of tilt of the bottom surface portion to an appropriate radial direction, and then sliding the nuts on the inclined portion.

With this nut arranging apparatus, a nut arranging apparatus capable of arranging nuts corresponding to socket portions of a multi-axis temporary tightening tool can be realized by a simple structure.

Also, in the nut arranging apparatus described above, the nut arranging portion may have a plurality of recessed portions capable of housing the nuts, formed in an arrangement corresponding to predetermined positions, in order to arrange the nuts in the predetermined positions.

With the nut arranging apparatus described above, nuts can be reliably arranged in positions corresponding to socket portions of a multi-axis temporary tightening tool.

Also, in the nut arranging apparatus described above, a groove that positions the nuts may be provided in a bottom portion of the recessed portion.

With the nut arranging apparatus described above, a groove that positions the nuts is provided in the bottom portion of the recessed portion, so the nuts are able to be fixed in set positions inside the recessed portion.

Also, in the nut arranging apparatus described above, the nut supplying portion may be configured such that the cylindrical portion is able to rotate around an axis set in the vertical direction, and the nut supplying portion may be configured to change the direction of tilt of the bottom surface portion to an appropriate direction with the rotation of the cylindrical portion.

This nut arranging apparatus enables the nuts to be dispersed, while being simple in structure with a small number of driving sources.

Also, in the nut arranging apparatus described above, the bottom surface portion may be configured to be able to change the direction of tilt to an appropriate direction by being supported via a universal joint.

This nut arranging apparatus enables the nuts to be dispersed, while being simple in structure with a small number of driving sources.

Also, in the nut arranging apparatus described above, the bottom surface portion may include a protruding portion that retains the nuts held in the holding portion, and a groove that causes the nuts held in the holding portion to fall over.

Also, in this nut arranging apparatus, the nuts are able to be reliably corrected to a posture suitable for the nuts to be arranged in the arranging positions.

Also, in the nut arranging apparatus described above, a width dimension of the groove may be smaller than a height dimension of a side surface portion of the nuts.

With the nut arranging apparatus described above, the width dimension of the groove is smaller than the height dimension of the side surface portion of the nuts.

This prevents the nuts from fitting into the groove while in a "standing posture" and being unable to fall over.

Also, in the nut arranging apparatus described above, the holding portion may include a restricting portion at the nut discharging port, and the restricting portion may be configured to allow only the nuts in a predetermined posture to pass through.

With this nut arranging apparatus, nuts are able to be reliably arranged in the arrangement positions.

Also, in the nut arranging apparatus described above, an interval between a bottom surface of the restricting portion and an upper surface of the bottom surface portion of the holding portion may be larger than a height dimension of a side surface portion of the nuts and smaller than a width across flat dimension of the nuts.

With this nut arranging apparatus, only nuts in a "lying posture" are able to pass under the restricting portion, so the nuts are able to be reliably fed to the recessed portions of the nut arranging portion.

Also, in the nut arranging apparatus described above, a step portion may be formed at an outer edge portion of the lower surface portion that opposes the restricting portion. This step portion becomes slightly lower than a portion other than the outer edge portion.

With this nut arranging portion, a nut that has passed under the restricting portion will always fall to the lower side of the step portion, and once a nut has fallen, it is unable to pass back through the restricting portion in the reverse direction. As a result, the nut is able to be more reliably fed to the recessed portions of the nut arranging portion.

Also, in the nut arranging apparatus described above, the nut supplying portion may include a first pin member for pushing the nuts, on an outer peripheral edge portion of the inclined portion.

With the nut arranging apparatus described above, the nuts are able to be reliably arranged in the arranging positions.

Also, in the nut arranging apparatus described above, the nut supplying portion may include a second pin member for pushing the nuts, in a position farther toward a radial inside than the outer peripheral edge portion of the inclined portion.

With this nut arranging apparatus, the nuts are able to be reliably fed to the arranging positions.

Also, in the nut arranging apparatus described above, a posture controlling plate that is both a portion that is supported by the nut arranging portion and does not rotate with rotation of the inclined portion, and a portion for abutting against the nuts on the inclined portion to correct a posture of the nuts may be provided on the inclined portion.

With this nut arranging apparatus, the nuts are able to be reliably fed to the arranging positions.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Next, example embodiments of the invention will be described. First, the overall structure of a multi-axis temporary tightening tool that arranges nuts using a nut arranging apparatus according to one example embodiment of the invention will be described with reference to FIGS. 1A to 7. The multi-axis temporary tightening tool illustrated in this example embodiment is a tool that is used to "temporarily tighten" a plurality of screwing members (a plurality of nuts 22 in this example embodiment; when appropriate, parts provided in plurality such as the nuts 22 will be described in the singular to facilitate understanding) onto a plurality of stud bolts 21a (see FIGS. 1A and 1B) that serve as screwable members provided on a rear axle assembly 21, such as that shown in FIG. 1A, when assembling a differential carrier (hereinafter referred to as the "work 20") during the work of assembling the rear axle assembly 21.

Figure 1B:
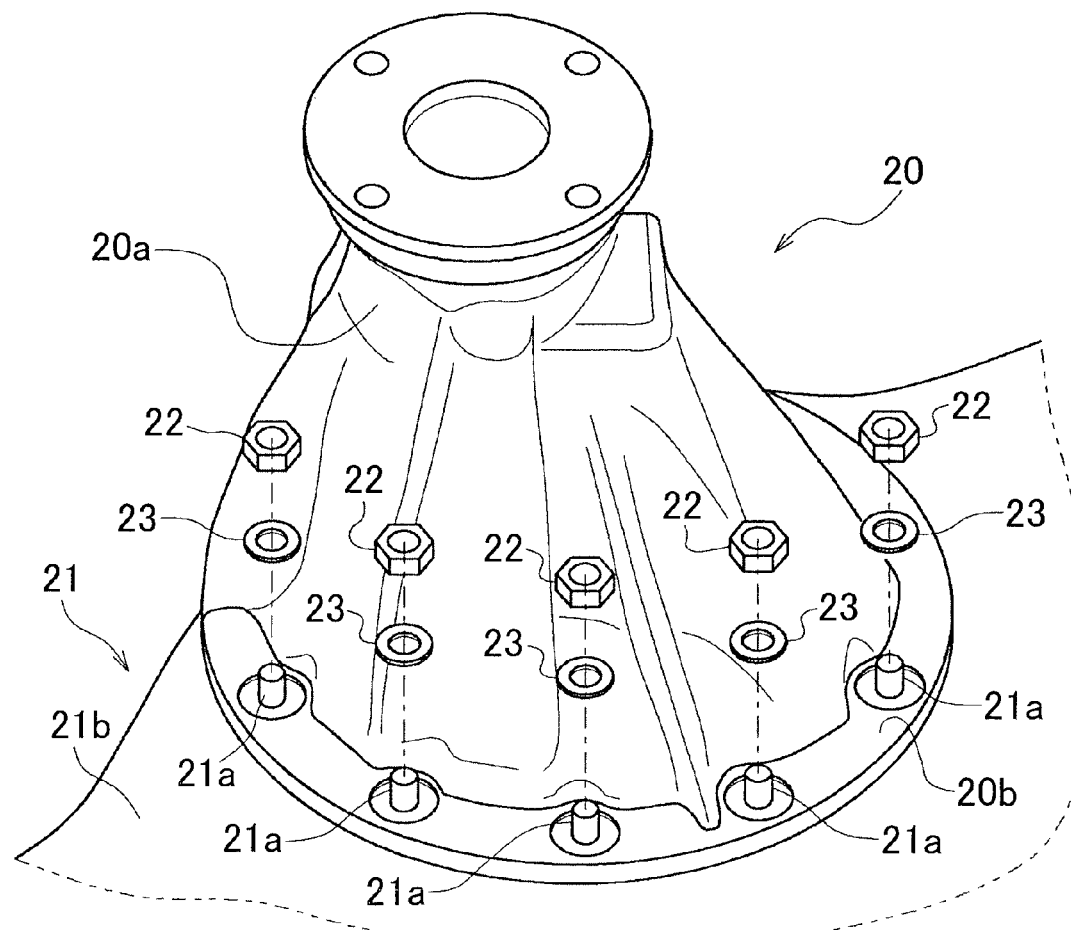
FIG. 1B is a partial perspective view showing a frame format of the arrangement of stud bolts that serve as screwable members and nuts that serve as screwing members around the work shown in FIG. 1A.
Figure 2:
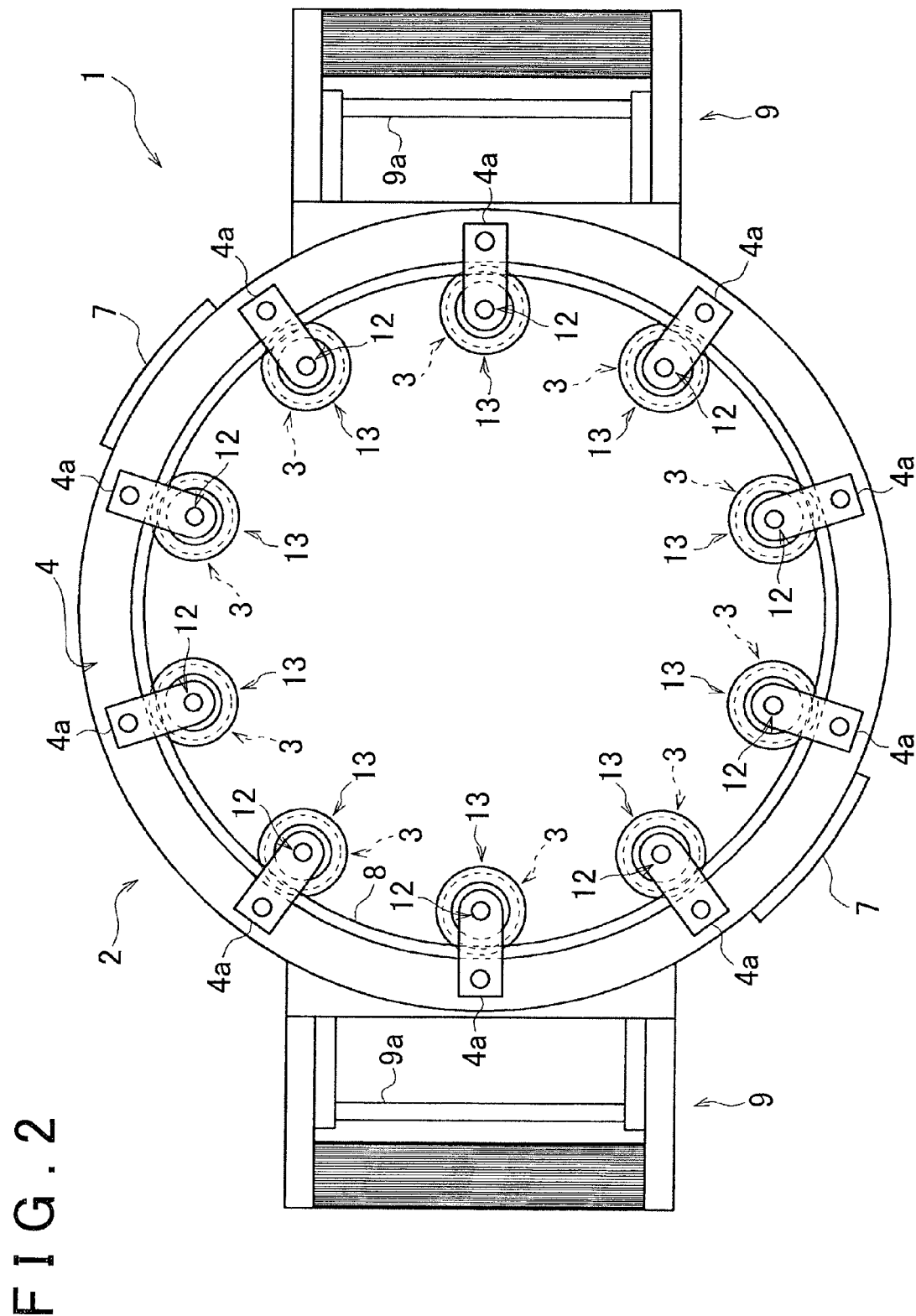
FIG. 2 is a plan view showing a frame format of the overall structure of a multi-axis temporary tightening tool according to the example embodiment of the invention.
Figure 3:
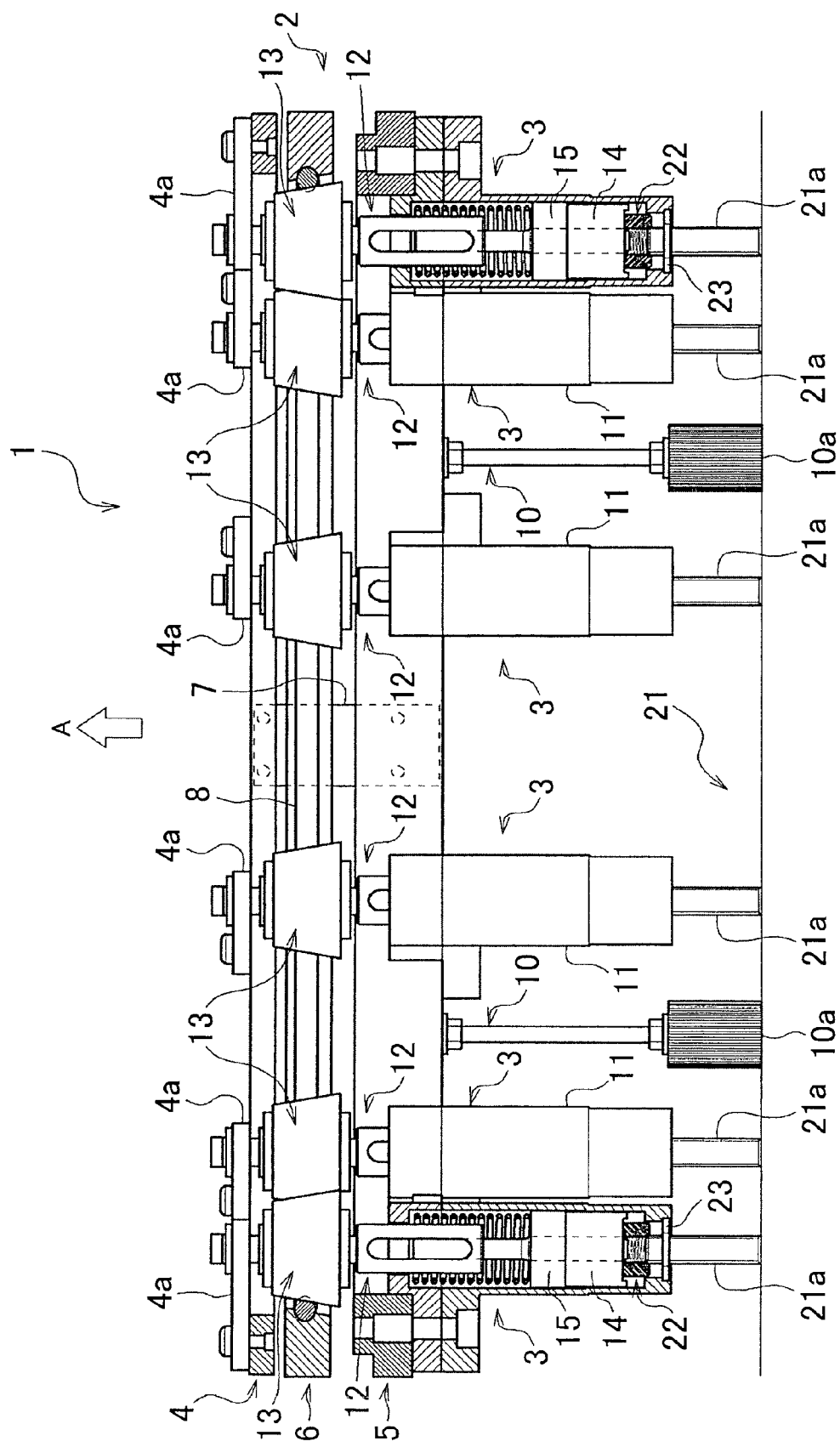
FIG. 3 is a side perspective view showing a frame format of the multi-axis temporary tightening tool according to the example embodiment of the invention.

As shown in FIGS. 2 and 3, the multi-axis temporary tightening tool 1 is a tool capable of arranging a nut 22 and a washer 23 (see FIG. 1B) on each of the plurality of stud bolts 21a, and simultaneously temporarily tightening the nuts 22 onto the stud bolts 21a. The multi-axis temporary tightening tool 1 includes a main body portion 2, and a plurality of socket portions 3 and the like. In this description, the multi-axis temporary tightening tool 1 is used with the axes of the stud bolts 21a and the socket portions 3 substantially aligned with each other, while the axial direction of the socket portions 3 of the multi-axis temporary tightening tool 1 is made to be in the vertical direction, when the rear axle assembly 21 is arranged such that the direction of arrow A shown in FIG. 3 is the vertical direction and the stud bolts 21a protrude vertically upward.

The main body portion 2 is both a portion for inputting rotary force (i.e., torque) to be applied to the nuts 22 by the multi-axis temporary tightening tool 1, and a portion for supporting the socket portions 3 that serve as output portions of the rotary force applied to the nuts .22. The main body portion 2 includes a support ring 4 (hereinafter referred to as an "upper support ring 4") that is a generally ring-shaped member arranged on an upper side of the main body portion 2 when the multi-axis temporary tightening tool 1 is being used, and a support ring 5 (hereinafter referred to as a "lower support ring 5") that is a generally ring-shaped member arranged on a lower side of the main body portion 2 when the multi-axis temporary tightening tool 1 is being used. The main body portion 2 also includes a rotating ring 6 that is a ring-shaped member interposed between the support rings 4 and 5.

Figure 4:
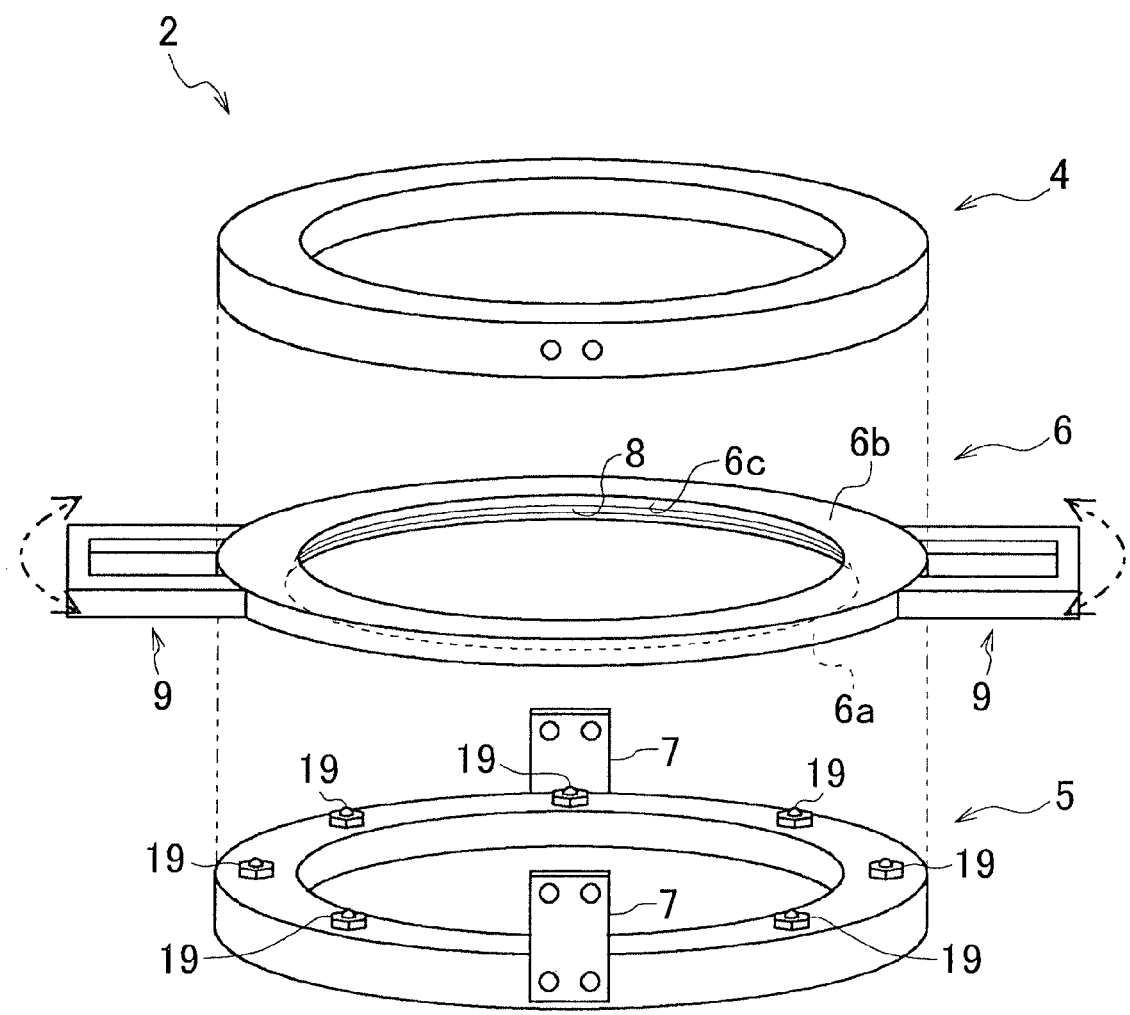
FIG. 4 is an exploded perspective view showing a frame format of a main body portion that forms part of the multi-axis temporary tightening tool shown in FIG. 3.

Also, as shown in FIG. 4, the support rings 4 and 5 are connected together while being kept parallel to each other, separated by a predetermined distance, by connecting plates 7. When the multi-axis temporary tightening tool 1 is being used, the support rings 4 and 5 are kept substantially horizontal, and the rotating ring 6 is arranged in between the connected support rings 4 and 5.

In this way, with the multi-axis temporary tightening tool 1, the main body portion 2 is formed using the ring-shaped members 4, 5, and 6, so a cavity can be ensured in a center portion of the main body portion 2, and a protruding portion 20a (see FIGS. 1A and 1B) of the work 20 can be inserted into this cavity of the main body portion 2.

Figure 5:
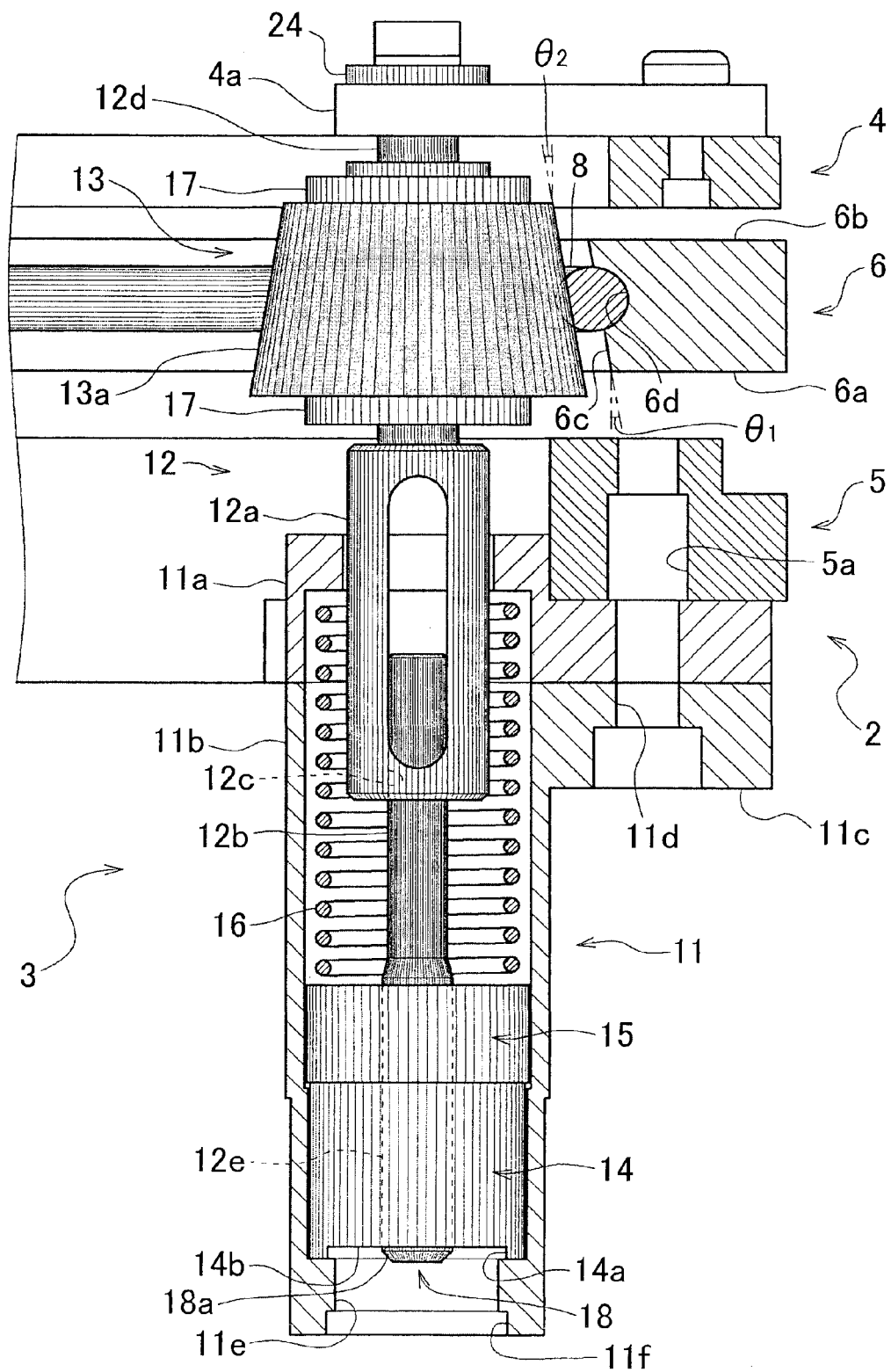
FIG. 5 is a side sectional view showing a frame format of a socket portion that forms part of the multi-axis temporary tightening tool.

As shown in FIGS. 3 and 5, the rotating ring 6 is a generally ring-shaped member in which the outside diameter dimension of a lower surface 6a is the same as the outside diameter dimension of an upper surface 6b, and the inside diameter dimension of the lower surface 6a is larger than the inside diameter dimension of the upper surface 6b. An inclined surface 6c formed such that the inside diameter of the rotating ring 6 becomes larger from the upper, surface 6b side toward the lower surface 6a side is provided on the inside of the rotating ring 6.

Also, a groove 6d that serves as a groove-shaped recessed portion into which a rubber ring 8 fits is formed in the inclined surface 6c. This groove 6d is formed so that the rubber ring 8 that is fit into the groove 6d will bulge out from the inclined surface 6c. In this example embodiment, the support rings 4 and 5 and the rotating ring 6 are made of resin, to help make the multi-axis temporary tightening tool 1 lighter while ensuring the rigidity of the multi-axis temporary tightening tool 1.

Also, the rotating ring 6 is interposed between the support rings 4 and 5, and is retained between the support rings 4 and 5, as shown in FIG. 4. Also, with the multi-axis temporary tightening tool 1 according to this example embodiment of the invention, a plurality of ball bearings 19 are arranged on the upper surface of the lower support ring 5. Downward stress that is generated when a worker rotates the rotating ring 6 is able to be reliably received by these ball bearings 19, so the rotating ring 6 is able to be rotated smoothly.

As shown in FIGS. 2 and 4, a pair of handles 9 that serve as operating portions when a worker rotates the rotating ring 6 are provided on the rotating ring 6. The rotating ring 6 is able to be rotated within a horizontal plane by the worker grasping the handles 9 and rotating them in a desired rotational direction.

Also, each handle 9 is provided with a stopper 9a for fixing the rotational position of the rotating ring 6, as shown in FIG. 2. The stopper 9a includes a locking portion, not shown, that locks the lower support ring 5. When the stopper 9a is not being grasped, the rotating ring 6 is locked so as to be unable to rotate relative to the lower support ring 5, by the locking portion locking the lower support ring 5. Also, when the worker grasps the handles 9 and squeezes the stoppers 9a, the lower support ring 5 that had been locked by the locking portion becomes unlocked, thus allowing the rotating ring 6 to rotate.

Figure 1A:
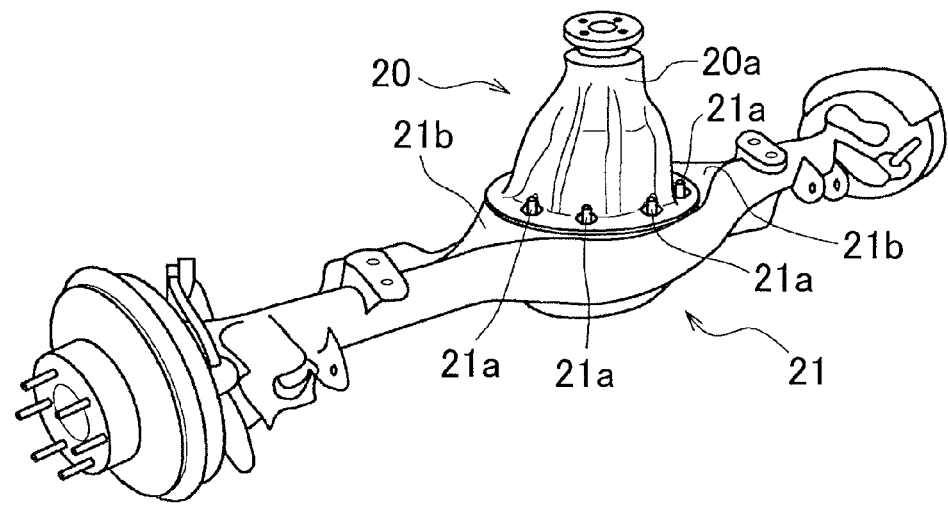
FIG. 1A is both a view showing a frame format of a work and a rear axle assembly to which a multi-axis temporary tightening tool according to one example embodiment of the invention is applied, and a perspective view showing a format of the work and the rear axle assembly in an assembled state.

Also, as shown in FIG. 3, a plurality of positioning stoppers 10 are provided protruding below the main body portion 2. The positioning stoppers 10 are portions that serve as abutting portions of the multi-axis temporary tightening tool 1 that abut against the rear axle assembly 21. These positioning stoppers 10 are arranged in positions in which they are able to abut against a reference surface 21b that is set on the rear axle assembly 21 as shown in FIGS. 1A and 1B. Also, the positioning stoppers 10 serve to maintain a constant separation distance between the main body portion 2 and the rear axle assembly 21, according to the protrusion height of the positioning stoppers 10 from the main body portion 2.

Also, an abutting portion 10a made of resin (such as urethane or the like) is provided on a tip end portion of each of the positioning stoppers 10. These abutting portions 10a prevent the work 20 from getting scratched or the like when the positioning stoppers 10 contact the work 20 (such as the flange portion 20b).

The socket portions 3 are portions that engage with the nuts 22 that serve as the screwing members in this example embodiment, and applying rotary force to the nuts 22. Each socket portion 3 includes a case 11, a rotating shaft 12, a rotary roller 13, an engaging portion 14, a magnet 15, and a spring 16, and the like, as shown in FIG. 5.

The case 11 is a member that rotatably supports the rotating shaft 12 and houses the engaging portion 14, the magnet 15, and the spring 16 and the like. The case 11 is formed divided into an upper-side case 11a (hereinafter referred to as the "upper case 11a") and a lower-side case 11b (hereinafter referred to as the "lower case 11b").

The case 11 includes a stay 11c that is a member for fixing the case 11 to the lower support ring 5. The case 11 is fixed to the lower support ring 5 by inserting a bolt, not shown, into a hole 11d formed in the stay 11c, and screwing the bolt into a nut hole 5a formed in the lower support ring 5. Also, the inside diameter dimension of the case 11 substantially matches the outside diameter dimension of the engaging portion 14 (however, the engaging portion 14 is slightly larger so that it can rotate and slide inside the case 11). The case 11 functions as a bearing for rotatably supporting the engaging portion 14, with the inner peripheral surface of the case 11 surrounding the outer peripheral surface of the engaging portion 14.

The rotating shaft 12 is a shaft member formed from two members, i.e., an upper rotating shaft 12a that is an upper member, and a lower rotating shaft 12b that is a lower member. The rotating shaft 12 forms a shaft member that is able to expand and contract in the axial direction, by the lower rotating shaft 12b being inserted into a hole 12c formed in the upper rotating shaft 12a in a relative non-rotatable state and a relative non-displaceable state in the axial direction.

An upper end portion 12d of the rotating shaft 12 is rotatably supported via a bearing member 24 by a stay member 4a provided protruding toward the inside of a ring shape from the upper support ring 4, as shown in FIGS. 2, 3, and 5. Also, the rotating shaft 12 is rotatably supported by the case 11 via the engaging portion 14 and the magnet 15, by the engaging portion 14 and the magnet 15 that are arranged in a lower end portion 12e of the rotating shaft 12 being rotatably supported by the case 11, as shown in FIGS. 3 and 5. As a result, the rotating shaft 12 is rotatably supported by the upper support ring 4 and the lower support ring 5. (i.e., the main body portion 2) via the case 11.

Figure 6:
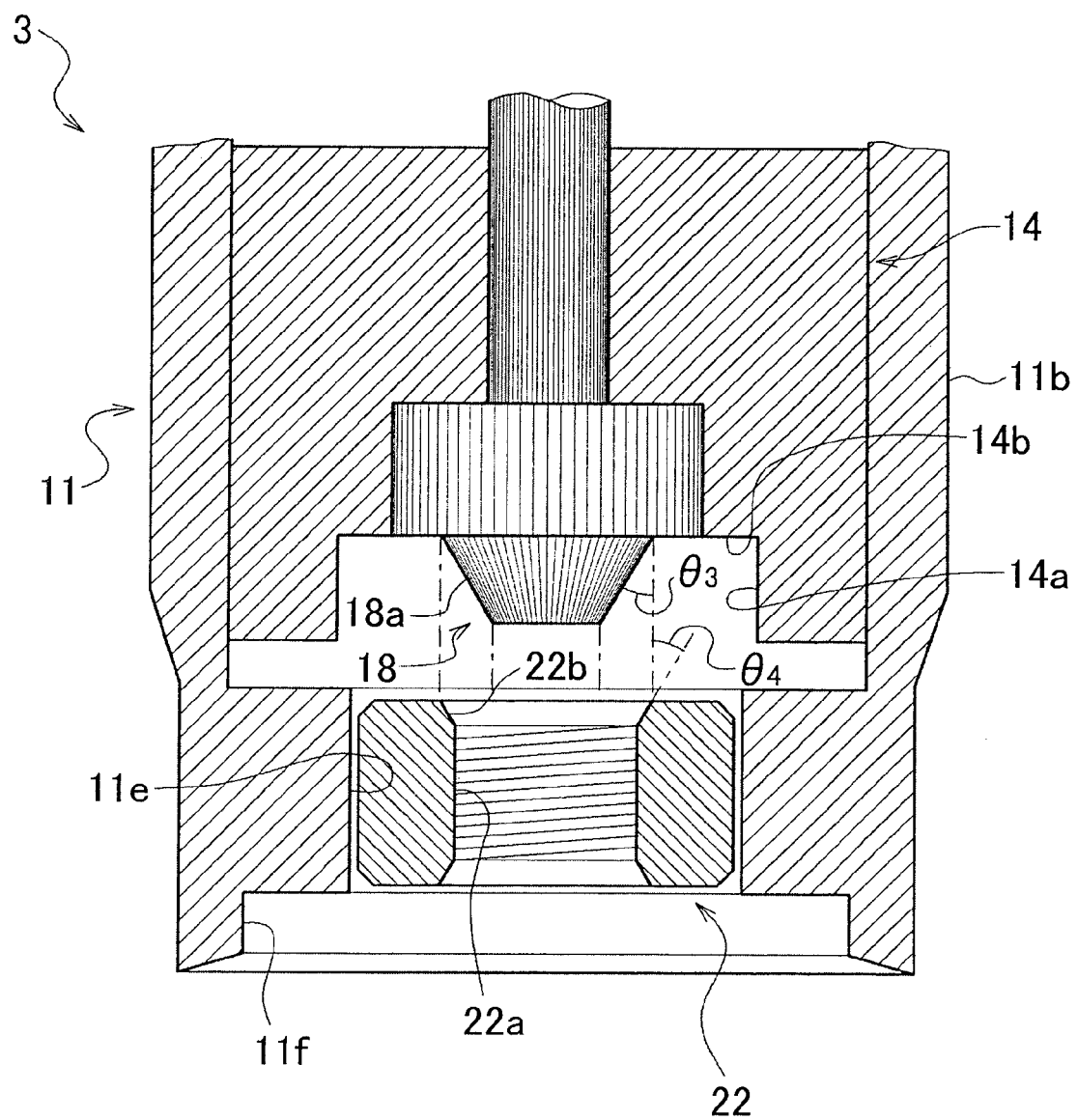
FIG. 6 is a side partial sectional view showing a frame format of a state in which a nut is loaded in the socket portion.

Also, the lower rotating shaft 12b is made from material that is not magnetic (i.e., a nonmagnetic body) such as aluminum, for example. As shown in FIG. 5, a positioning portion 18 that is a protruding portion is formed on a lower end portion 12e of the lower rotating shaft 12b. An inclined surface 18a such as that shown in FIG. 6 is formed on the positioning portion 18. The diameter of the apex portion of the positioning portion 18 is smaller than a nut hole 22a formed in the nut 22, and the diameter of a base portion of the positioning portion 18 is substantially the same as that of the nut hole 22a formed in the nut 22. In this way, the positioning portion 18 is formed in a truncated cone shape with the inclined surface 18a that is a tapered surface that becomes smaller in diameter farther downward.

Figure 7:
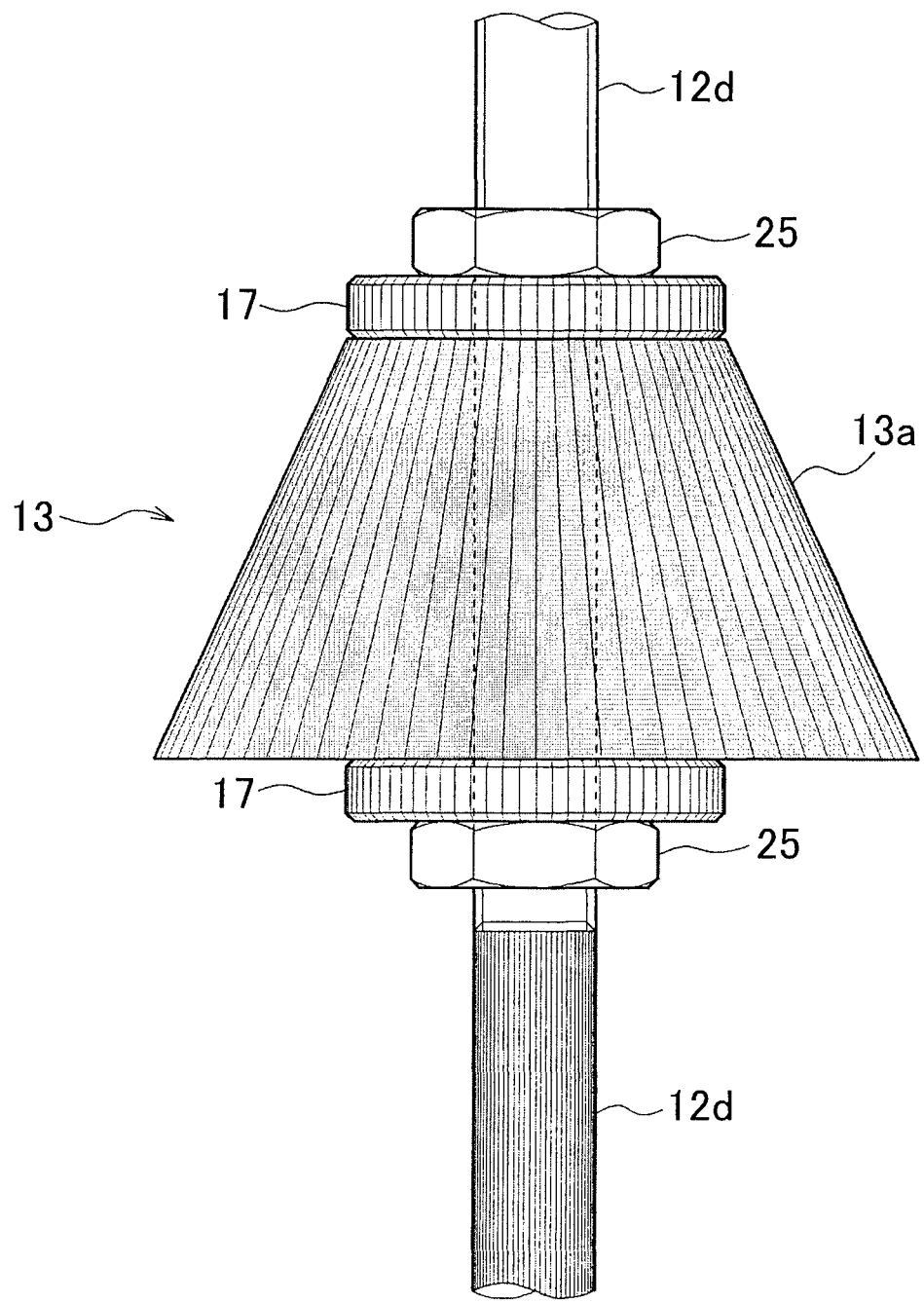
FIG. 7 is a partial side view showing a frame format of a rotary roller that forms part of the socket portion.

The rotary roller 13 is a portion for inputting rotary force to the rotating shaft 12, and is formed by a generally truncated cone-shaped rubber member that has a roller surface 13a that is a surface that is inclined with respect to the axial direction. The rotary roller 13 is arranged in a predetermined position on the upper end portion 12d of the rotating shaft 12 by being squeezed by generally disc-shaped plates 17 that are positioned by nuts 25, above and below the rotary roller 13, as shown in FIG. 7.

An inclination angle θ2 of the roller surface 13a of the rotary roller 13 shown in FIG. 5 is substantially the same as an inclination angle θ1 of the inclined surface 6c of the rotating ring 6. The roller surface 13a and the inclined surface 6c are formed so as to be substantially parallel. Also, with this multi-axis temporary tightening tool 1, making the inclination angle θ2 of the roller surface 13a substantially match the inclination angle θ1 of the inclined surface 6c enables the rotary force input to the rotating ring 6 to be reliably transmitted to the rotary roller 13 without any transmission loss.

As shown in FIG. 5, the engaging portion 14 is a generally cylindrical member made from magnetic material (i.e., a magnetic body) such as iron, for example, and is a member that serves to engage with the nut 22 that is a screwing member, and transmit rotary force to the nut 22. A groove 14a is formed in a surface positioned on a lower end when the engaging portion 14 is being used. The engaging portion 14 engages the nut 22 at the groove 14a.

The width of the groove 14a is a dimension that is slightly larger than the width across flat of the nut 22 and smaller than the width across corner of the nut 22. Two corner points of the nut 22 are retained by the groove 14a. A dimension, that both enables the nut 22 to easily fit into the groove 14a, and enables the engaged state once the nut 22 is fit into the groove 14a to be reliably maintained is selected. That is, the engaging portion 14 is able to apply rotary force to the nut 22 by the engaging portion 14 being rotated about the rotating shaft 12 with the nut 22 fit into the groove 14a.

The positioning portion 18 is provided protruding downward in the groove 14a. The nut 22 that is engaged by the engaging portion 14 is able to be precisely positioned by restricting the outer peripheral portion of the nut 22 that is fit into the groove 14a by the groove 14a, and fitting the positioning portion 18 into the inner peripheral portion of the nut 22 (i.e., the nut hole 22a).

Also, an inclination angle θ3 of the inclined surface 18a is formed substantially matching an inclination angle θ4 of a tapered portion 22b formed at the nut hole 22a of the nut 22, and enables the nut 22 to be more precisely positioned by having the inclined surface 18a of the positioning portion 18 that is fit into the nut hole 22a match the tapered portion 22b.

Also, the magnet 15 is arranged adjacent to the engaging portion 14, on the upper portion of the engaging portion 14. The magnet 15 magnetizes the engaging portion 14 that is a magnetic body by attracting the engaging portion 14. As a result, the nut 22 that contacts the engaging portion 14 is able to be attracted by the engaging portion 14. The attraction force generated by the engaging portion 14 can be adjusted by changing the thickness of the engaging portion 14.

Also, when the nut 22 is separated from the engaging portion 14 and is only contacting the positioning portion 18, the attraction force of the magnet 15 does not affect the nut 22 because the positioning portion 18 that is a nonmagnetic body is not magnetized by the magnet 15.

Also, the spring 16 that is an elastic member is arranged in a space above the magnet 15 inside of the case 11. The spring 16 is inserted into the space defined by the case 11 and the magnet 15 in a state compressed to a shorter length than the regular length. The spring 16 is able to constantly produce downward elastic force against the magnet 15 and the engaging portion 14 when the multi-axis temporary tightening tool 1 is being used. As a result, when the multi-axis temporary tightening tool 1 is being used, the nut 22 that is fit into the groove 14a of the engaging portion 14 is able to be constantly pushed downward by the engaging portion 14.

Next, the overall structure of a nut arranging apparatus according to the example embodiment of the invention will be described with reference to FIGS. 8 to 14.

Figure 8:
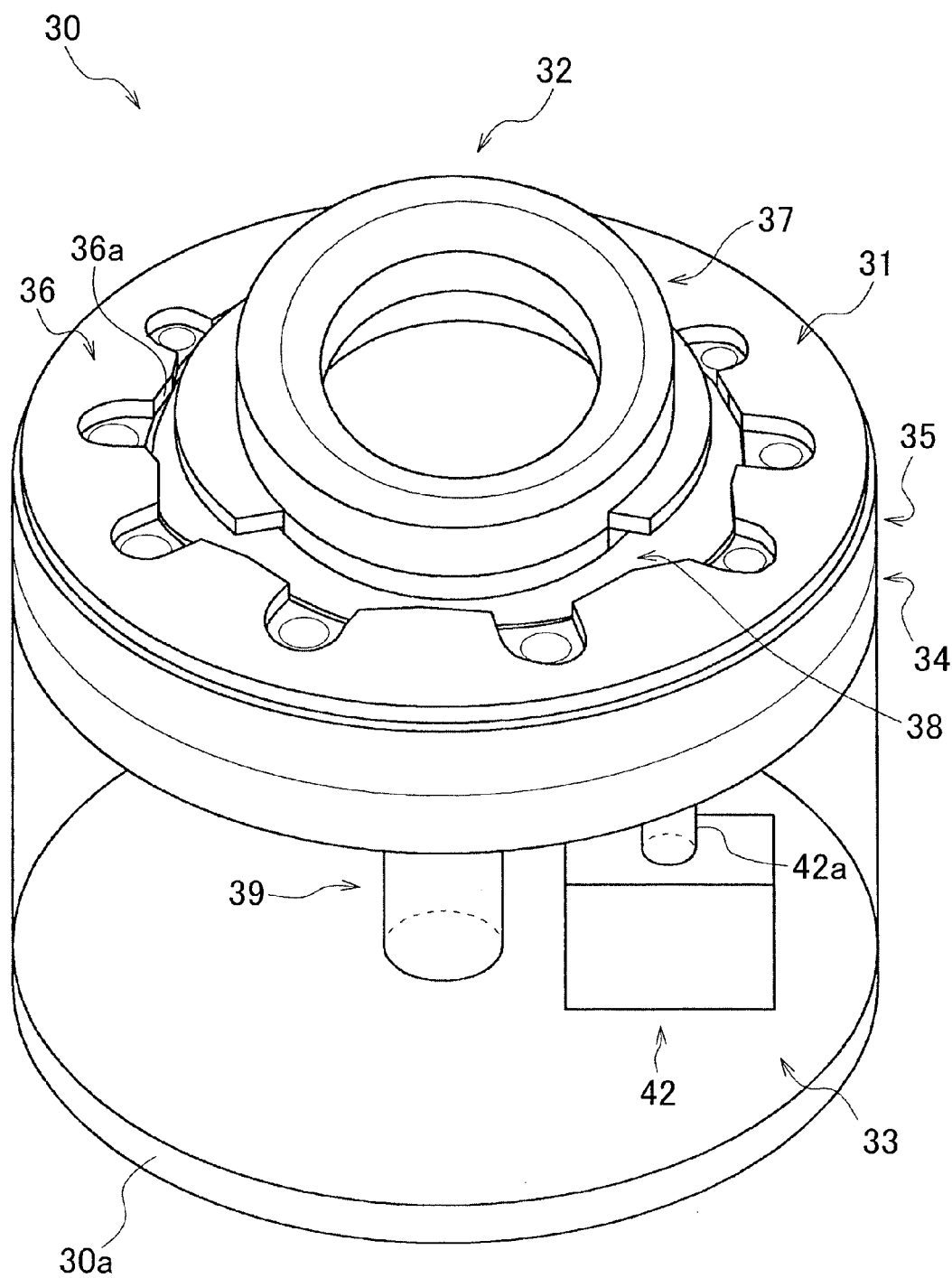
FIG. 8 is a perspective view showing a frame format of the overall structure of a nut arranging apparatus according to the example embodiment of the invention.
Figure 9:
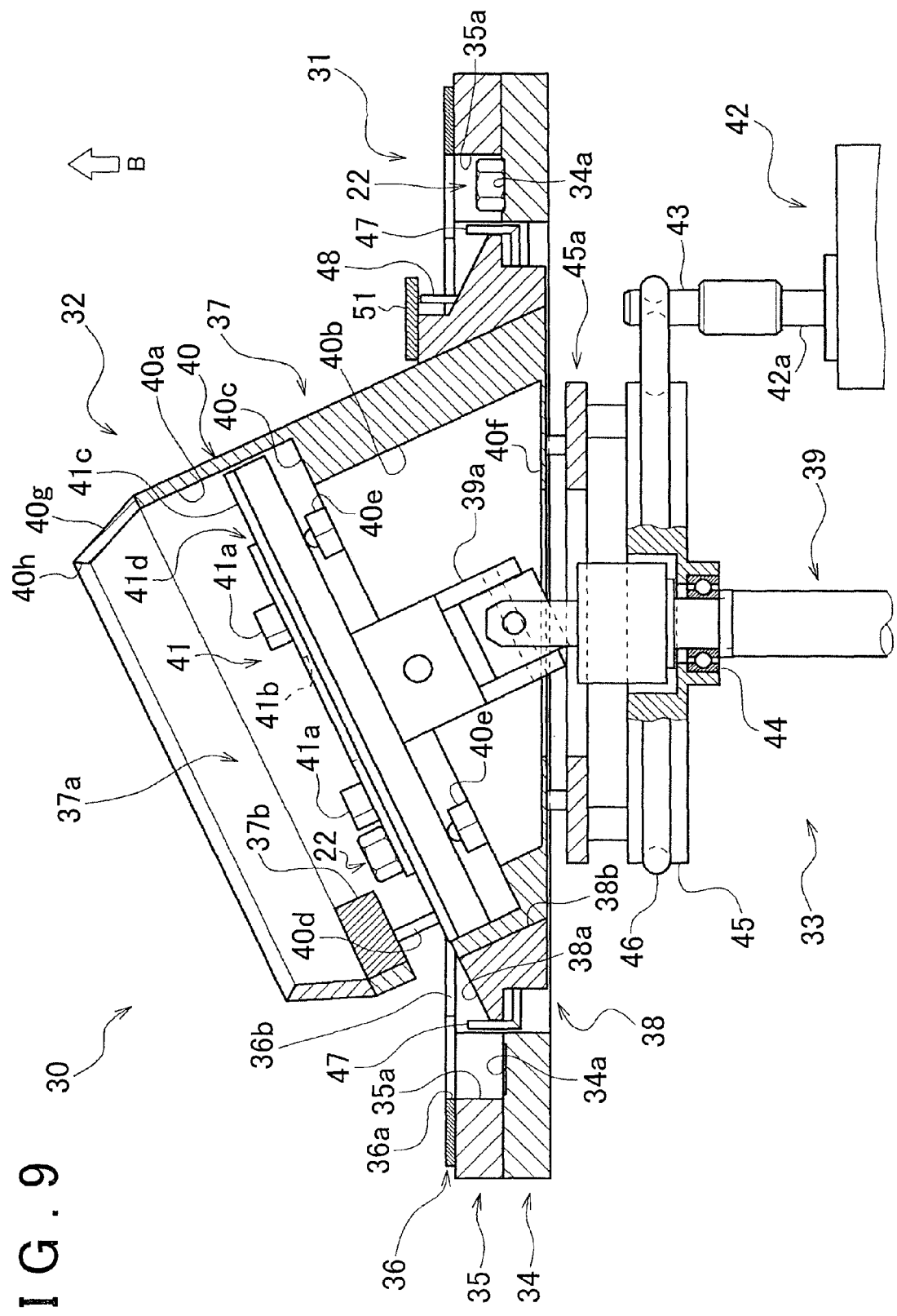
FIG. 9 is a side perspective view showing a frame format of the overall structure of the nut arranging apparatus according to the example embodiment of the invention.

As shown in FIGS. 8 and 9, the nut arranging apparatus 30 according to the example embodiment of the invention is an apparatus for arranging the nuts 22 (see FIG. 1B) in positions (hereinafter referred to as "arranging positions") corresponding to the arrangement of the socket portions 3 (see FIG. 2) of the multi-axis temporary tightening tool 1. The nut arranging apparatus 30 includes a nut arranging portion 31, a nut supplying portion 32, and a driving portion 33, and the like. The direction of arrow B in FIG. 9 (i.e., vertically upward) is up when the nut arranging apparatus 30 is being used, and the direction of arrow B matches the upward direction when the multi-axis temporary tightening tool 1 is being used (i.e., the direction of arrow A shown in FIG. 3).

The nut arranging portion 31 is fixed via a frame and the like, not shown, to (in a position above) a generally disc-shaped base portion 30a that will become a portion for supporting the nut arranging apparatus 30 and is arranged below the nut arranging apparatus 30, as shown in FIG. 8. The driving portion 33 is housed in a generally cylindrical space formed between the base portion 30a and the nut arranging portion 31. Also, the nut supplying portion 32 is supported by a support shaft 39 that is a shaft member that stands erect vertically upwards in substantially the center of the base portion 30a.

Figure 10:
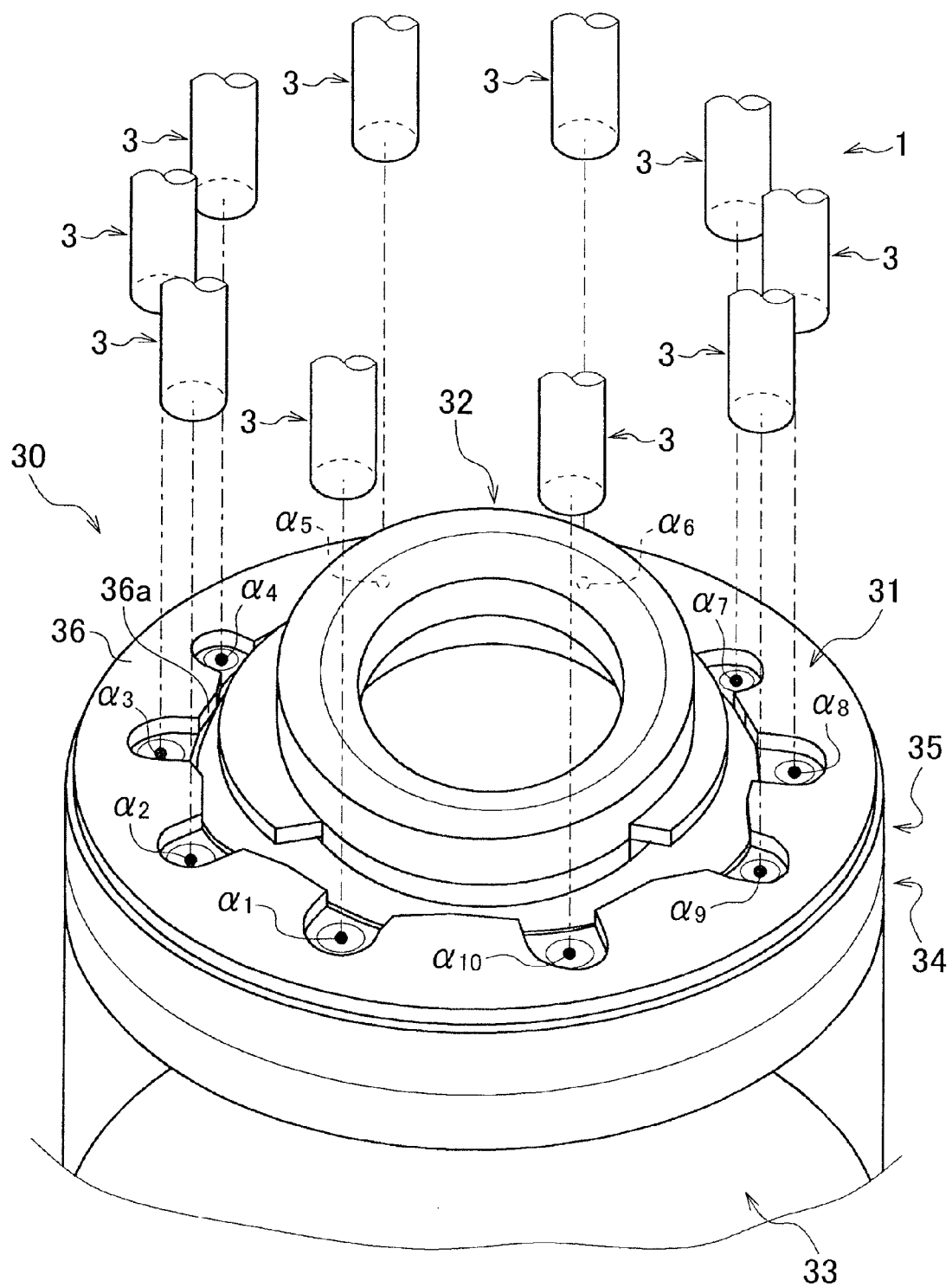
FIG. 10 is a perspective view showing a frame format of an arranging position setting state of the nut arranging apparatus according to the example embodiment of the invention.

Here, the nut arranging apparatus will be described in more detail. As shown in FIG. 10, in the nut arranging apparatus 30, arranging positions α (α1 to α10) are set to positions that fall directly below the sockets 3, when the socket portions 3 of the multi-axis temporary tightening tool 1 are in a vertically downward posture.

With the nut arranging apparatus 30 in this example embodiment, a case is illustrated in which 10 arranging positions α (α1 to α10) are set in the nut arranging portion 31 corresponding to the number (10 in this example embodiment) of socket portions 3, provided on the multi-axis temporary tightening tool 1. However, the nut arranging apparatus of the invention is not limited by the number of arranging positions set in the nut arranging portion. Also, in this example embodiment, the lengths of the socket portions 3 are all the same, so the arranging positions α1 to α10 are set on the same plane, but if the lengths of the socket portions 3 are different, the arranging positions may also be set on different planes.

The nut arranging portion 31 is a portion for forming a portion for arranging the nuts in positions corresponding to the predetermined arranging positions α1 to α10, and includes a base member 34, a guide member 35, and a guide plate 36 and the like, as shown in FIGS. 8, 9, and 11A and 11B.

Figure 11A:
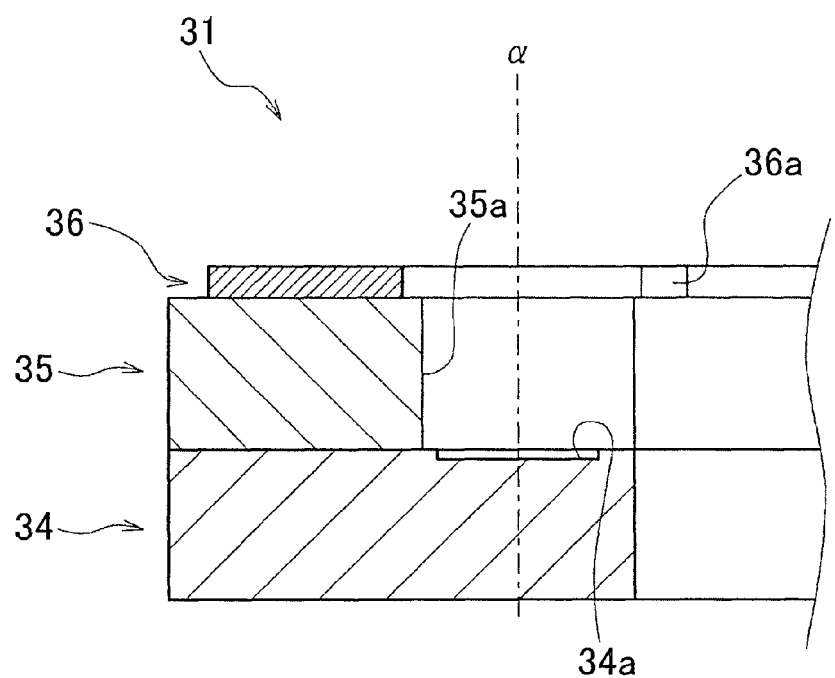
FIG. 11A is both a view showing a frame format of a nut arranging portion that forms part of the nut arranging apparatus, and a partial sectional view showing a frame format of the nut arranging portion.
Figure 11B:
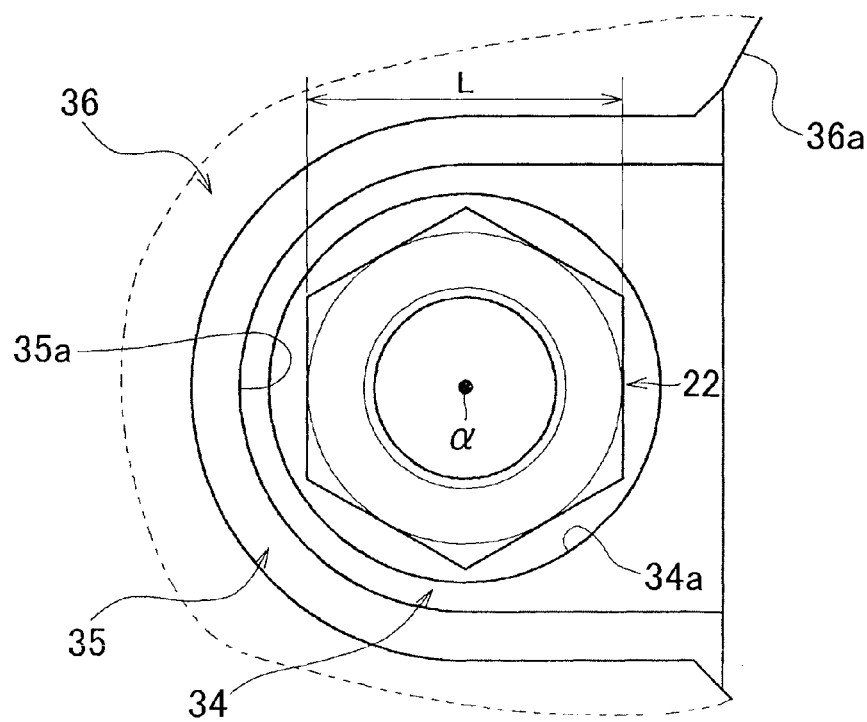
FIG. 11B is a partial plan view of the nut arranging portion shown in FIG. 11A.

The base member 34 is a generally ring-shaped member that forms a portion (i.e., a bottom surface portion) of the nut arranging portion 31 for placing the nuts. As shown in FIGS. 11A and 11B, a recessed portion 34a that is a generally cylindrical recessed portion for positioning the nut is formed in positions corresponding to the arranging positions α. The diameter of the recessed portion 34a when viewed from above is slightly larger than the diameter of the circumscribed circle of the nut 22, and is large enough for the nut 22 to fall into the recessed portion 34a. The nut 22 is positioned in the arranging position α by falling into the recessed portion 34a.

That is, in the nut arranging apparatus 30 according to the example embodiment of the invention, the nut arranging portion 31 has a plurality of the recessed portions 34a that are able to accommodate the nuts 22, formed in an arrangement corresponding to the predetermined positions (i.e., the arranging positions α1 to α10) in order to arrange the nuts 22 in the predetermined positions (i.e., the arranging positions α1 to α10). This kind of structure enables the nuts 22 to be reliably arranged in positions corresponding to the socket portions 3 of the multi-axis temporary tightening tool 1.

Figure 12:
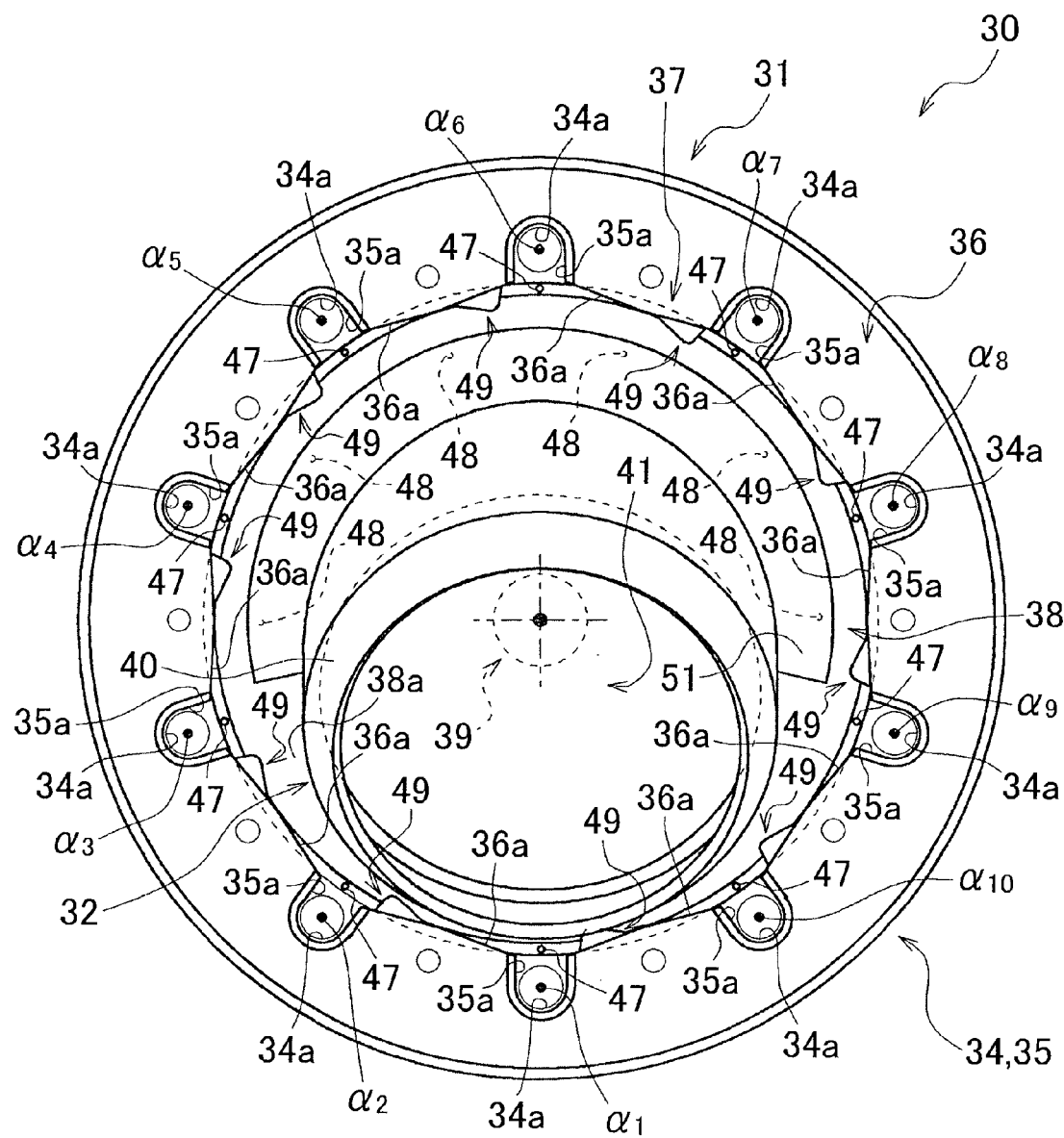
FIG. 12 is a plan view showing a frame format of the nut arranging apparatus according to the example embodiment of the invention.

The guide member 35 is a generally ring-shaped member that forms a portion for guiding the nut 22 supplied to the nut arranging portion 31 so that it (i.e., the nut 22) will reliably fall into the recessed portion 34a. As shown in FIGS. 11A and 11B, a guide portion 35a that is a generally U-shaped recessed portion when viewed from above is formed in a position surrounding the recessed portion 34a. Ten (10) of these guide portions 35a are formed on the guide member 35 illustrated in this example embodiment, as shown in FIG. 12. The guide portions 35a are formed in a radial arrangement with the open portion sides of the generally U-shaped shapes facing the axis of the guide member 35.

The arranging positions α1 to 10α on the nut arranging apparatus 30 are formed by overlapping the guide member 35 with the base member 34 while positioning the guide member 35 on the base member 34, and integrating these members 34 and 35 together.

The guide plate 36 is a generally ring-shaped member for ordering the flow of the nuts 22 supplied to the nut arranging portion 31. A plurality of inclined portions 36a corresponding to the arranging positions α1 to α10 are formed on an inner peripheral portion of the guide plate 36.

A portion closest to the axis, of each of the inclined portions 36a that are formed on the inner peripheral portion of the guide plate 36 are arranged farther to the radial inside than the inner peripheral surfaces of the base member 34 and the guide member 35. Also, portions farthest to the radial outside, of the inclined portions 36a are arranged in substantially the same positions as the inner peripheral surfaces of the base member 34 and the guide member 35. That is, the inclined portions 36a form a planar portion for aligning the nuts 22 within a range that extends from a position that substantially matches the inner peripheral surfaces of the base member 34 and the guide member 35 when viewed from above, to a position to the radial inside of the inner peripheral surfaces of the base member 34 and the guide member 35.

Figure 15:
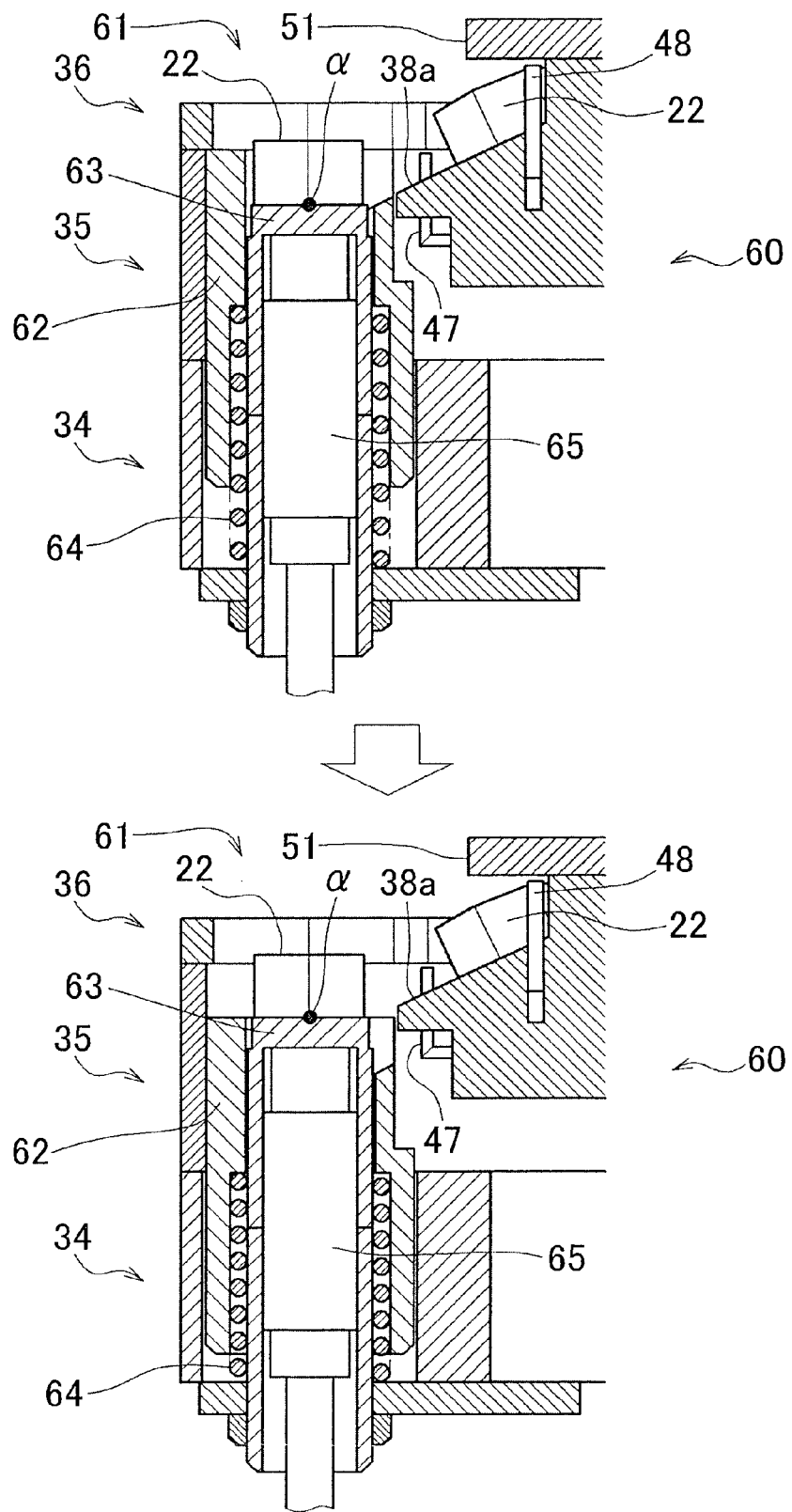
FIG. 15 is a view showing a frame format of a nut arranging portion according to another example embodiment of the invention.

Here, a nut arranging apparatus provided with a nut arranging portion according to another example embodiment will be, described with reference to FIG. 15. For example, as shown in FIG. 15, with a nut arranging apparatus 60 provided with a nut arranging portion 61 according to this other example embodiment, an arranging position α can be formed using a generally cylindrical positioning member 62 that extends through the base member 34 and the guide member 35, and a bottom surface member 63 that is inserted into the positioning member 62 and forms a bottom portion of the positioning member 62. The bottom surface member 63 is fixed to the base member 34, and the nut 22 is supported from below by this bottom surface member 63.

Also, the positioning member 62 has an inside diameter dimension substantially the same as the outside diameter dimension of the bottom surface member 63, and is able to be displaced in the axial direction of the positioning member 62 that is generally cylindrical, with the bottom surface member 63 inserted. Also, the positioning member 62 abuts against a spring 64 at a lower portion. Therefore, the positioning member 62 is able to be displaced downward by being pressed downward, or is able to be displaced upward and returned by restoring force of the spring 64 to the original position before being pressed down, by the downward pressure being released.

Furthermore, in this example embodiment, a sensor 65 is integrated into the bottom surface member 63 that has a space therein. The sensor 65 is a non-contact sensor that is able to detect whether there is a nut 22 in the arranging position α. Also, arranging the sensors 65 at the arranging positions α1 to α10 makes it possible to detect whether there are nuts 22 arranged in the arranging positions α1 to α10. When it is detected that nuts 22 are arranged in all of the arranging positions α1 to α10, the nut arranging apparatus 60 automatically stops.

Figure 13:
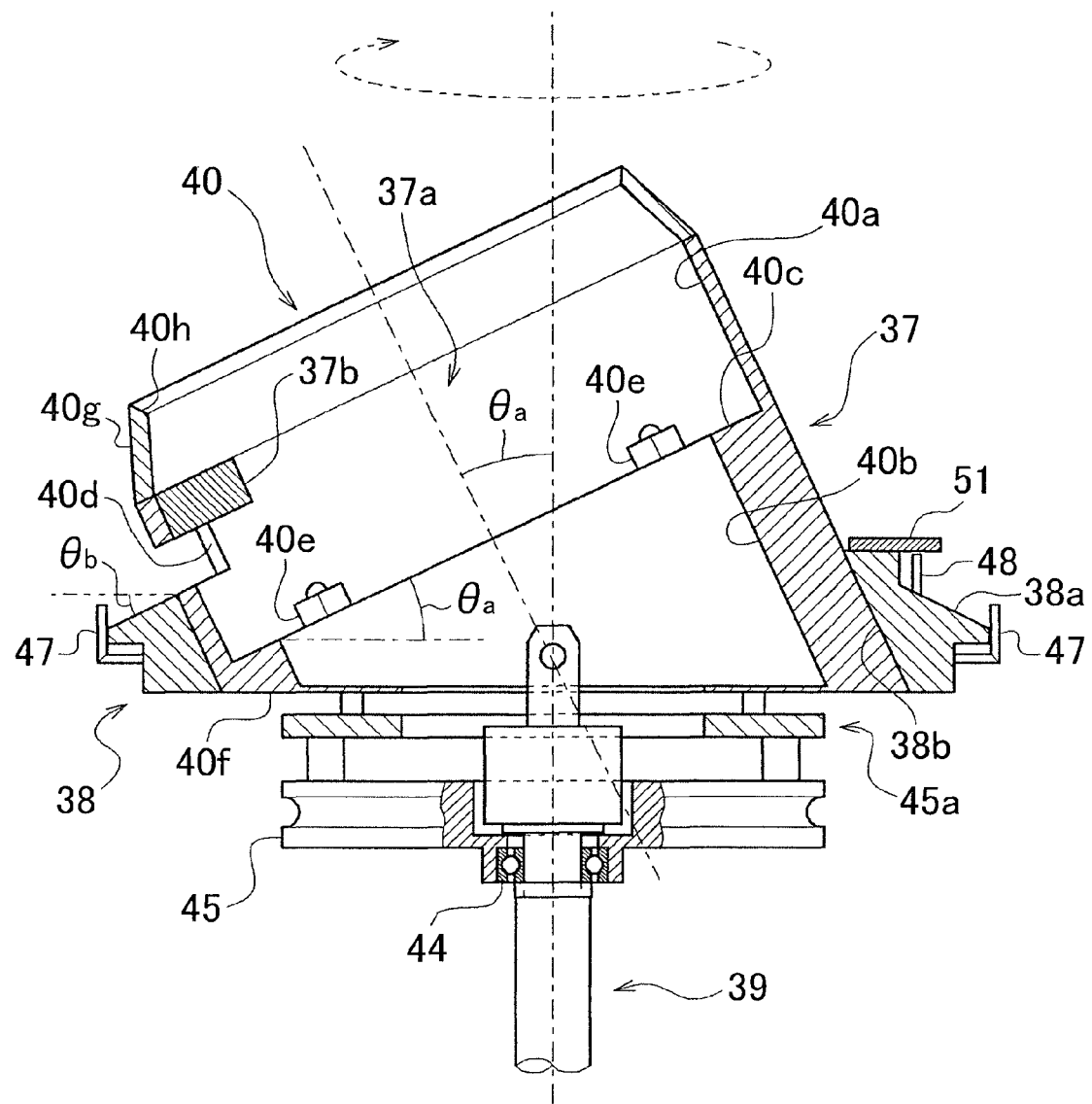
FIG. 13 is a side sectional view showing a frame format of a nut supplying portion that forms part of the nut arranging apparatus.

The nut supplying portion 32 is a portion for supplying nuts one by one to the arranging positions α1 to α10 set in the nut arranging portion 31, and includes a tumbling portion 37, a rotating inclined plate 38, and a support shaft 39, and the like, as shown in FIGS. 9 and 13.

The tumbling portion 37 is a portion for correcting the posture of a nut to a posture suitable for the nut to be arranged on the nut arranging portion 31, by tumbling the nut in the tumbling portion 37, and includes a cylindrical portion 40 and a bottom plate portion 41 and the like.

The cylindrical portion 40 that is a generally cylindrical portion has an outside diameter dimension that is larger than the outside diameter dimension of the bottom plate portion 41. The cylindrical portion 40 has a housing portion 40a that is a generally cylindrical void portion that has an inside diameter dimension that is substantially the same as (though slightly larger than) the outside diameter dimension of the bottom plate portion 41, and a reduced diameter portion 40b that is a generally cylindrical void portion and has a smaller inside diameter dimension than the inside diameter dimension of the housing portion 40a. Also, a support portion 40c that is a generally ring-shaped planar portion that has a width of the difference between the dimensions of the portions 40a and 40b, and is a surface that is orthogonal to the axis of the cylindrical portion 40, is formed on a boundary portion of the housing portion 40a and the reduced diameter portion 40b.

Also, an end portion arranged on a lower side when the cylindrical portion 40 is being used has a shape that is cut off by a plane that is inclined at a predetermined angle θa with respect to the axis of the cylindrical portion 40. Also, the cylindrical portion 40 is used with a bottom portion 40f, that is the lower end surface that is cut off by the inclined plane, kept horizontal, i.e., with the axis of the cylindrical portion 40 being inclined by a predetermined angle θα with respect to the vertical direction. As a result, the support portion 40c that is formed as a surface orthogonal to the axis of the cylindrical portion 40 is always kept inclined by the predetermined angle θα from the horizontal direction.

The cylindrical portion 40 is supported by the support shaft 39 by the bottom portion 40f of the cylindrical portion 40 being fixed to a support portion 45a of a driven pulley 45. Also, the driven pulley 45 is rotatably supported on the support shaft 39 via a bearing 44, and the cylindrical portion 40 is also rotatably supported on the support shaft 39.

A plurality of ball rollers 40e for supporting the bottom plate portion 41 are provided on the support portion 40c. The ball rollers 40e are in point contact with, and thus support, the lower surface of the bottom plate portion 41, with the bottom plate portion 41 following the inclination angle of the support portion 40c.

Also, a nut discharging port 40d that is an open portion for discharging a nut from the cylindrical portion 40 is a side surface positioned low in the direction of tilt of the support portion 40c and is formed in the cylindrical portion 40 by cutting out a portion positioned farther on the upper side, with respect to the axial direction of the cylindrical portion 40, than the position where the bottom plate portion 41 is arranged. Also, the opening height of the nut discharging port 40d with respect to the axial direction of the cylindrical portion 40 is a larger dimension than the height of the nut 22, as shown in FIG. 9. Furthermore, the opening width of the nut discharging port 40d is a sufficiently larger dimension than the maximum width of diagonal corners of the nut 22.

Moreover, a cover 40g that is formed in a tapered pipe shape for reducing the inside diameter dimension of the cylindrical portion 40 is provided on an upper portion of the cylindrical portion 40. A loading port 40h that is a generally round open portion having an inside diameter dimension that is smaller than the inside diameter dimension of the housing portion 40a is formed in an end portion on the upper side of the cover 40g. The nuts are loaded into the cylindrical portion 40 through this loading port 40h, and nuts that have been loaded into the cylindrical portion 40 are prevented from easily falling out of the cylindrical portion 40 by the cover 40g.

Figure 14:
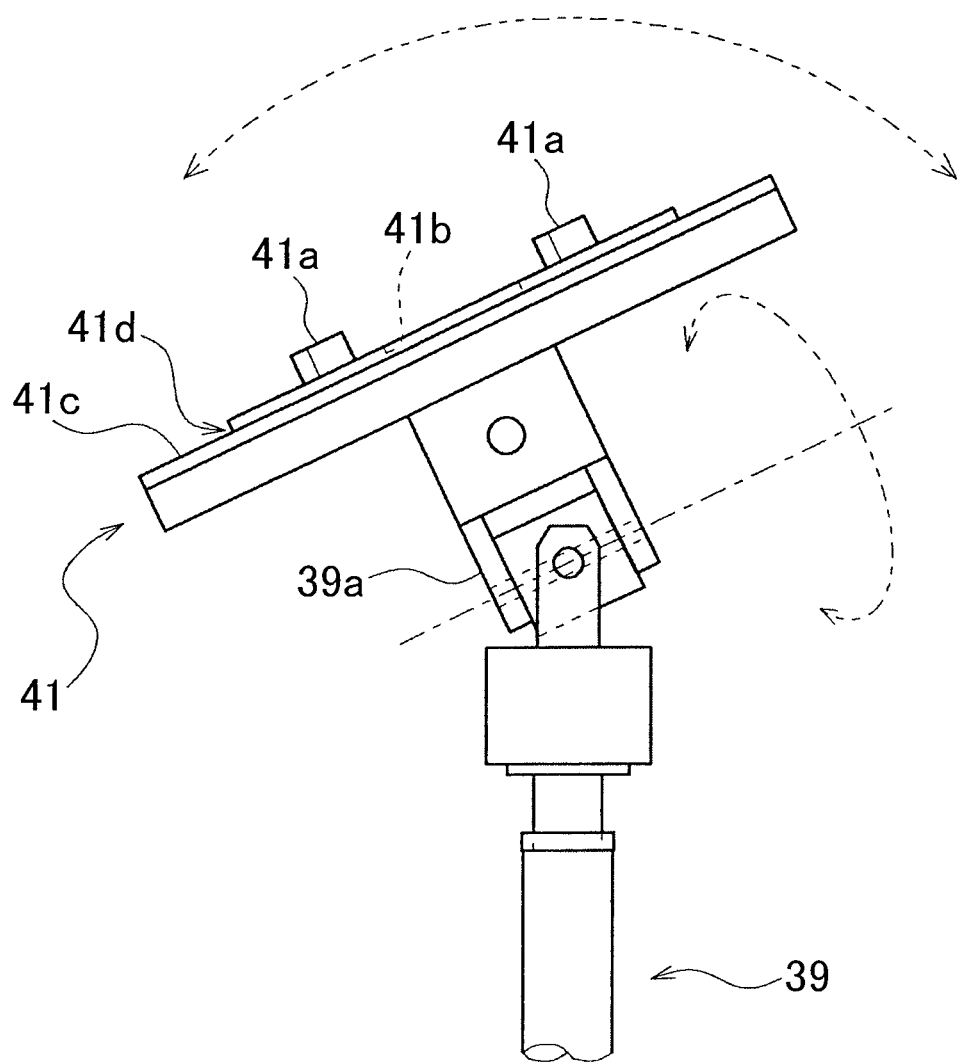
FIG. 14 is a side view showing a frame format of a bottom plate portion that forms part of the nut supplying portion.

The bottom plate portion 41 is a portion for forming a generally round inclined surface for tumbling the nuts 22 (i.e., causing the nuts 22 to roll and slide down). A plurality of snaring portions 41a are provided on the surface, and a plurality of grooves 41b that are recessed are formed in the surface, as shown in FIGS. 9 and 14. The bottom plate portion 41 serves to tumble the nuts that are on the bottom plate portion 41 to correct the posture of the nuts, by changing the inclination angle of the bottom plate portion 41 or by displacing the snaring portions 41a and the grooves 41b with that change.

Also, the bottom plate portion 41 is supported on the support shaft 39 via a universal joint 39a. Here, the universal joint 39a is fixed to the support shaft 39 so as to be unable to rotate relative to the support shaft 39. As a result, the bottom plate portion 41 is configured so as to be unable to rotate around the support shaft 39, be able to change its inclination angle (i.e., the bottom plate portion 41) to an appropriate angle with respect to the axial direction of the support shaft 39, and moreover, be able to change the direction of tilt to an appropriate radial direction around the support shaft 39.

Also, the bottom plate portion 41 is used in a state housed in the housing portion 40a of the cylindrical portion 40, as shown in FIG. 9. Also, a holding portion 37a that is a surrounding space for holding nuts in the tumbling portion 37 is formed by combining the cylindrical portion 40 and the bottom plate portion 41 in a predetermined arrangement. The holding portion 37a is a portion for holding nuts that are in a posture unsuitable for the nuts to be supplied to the nut arranging portion 31, until the nuts that have been supplied to the tumbling portion 37 come to be in a posture suitable for the nuts to be supplied to the nut arranging portion 31.

When the bottom plate portion 41 is arranged on the support portion 40c, the ball rollers 40e provided on the support portion 40c abut against the lower surface of the bottom plate portion 41. As a result, the bottom plate portion 41 is retained in a state inclined by a predetermined angle θa with respect to a horizontal plane, following the inclination angle of the support portion 40c.

Also, when the cylindrical portion 40 rotates around the support shaft 39, the direction of tilt of the support portion 40c changes, and with this change, the bottom plate portion 41 tilts to follow the support portion 40c (more specifically, the ball rollers 40e). Accordingly, the direction of tilt of the bottom plate portion 41 changes in the same direction as the direction of tilt of the support portion 40c, while maintaining the state inclined by the predetermined angle θa with respect to the horizontal plane.

That is, even if the direction of tilt of the bottom plate portion 41 changes with the rotation of the cylindrical portion 40 around the support shaft 39, the nut discharging port 40d is always positioned low in the direction of tilt of the bottom plate portion 41. In other words, when the cylindrical portion 40 rotates around the support shaft 39, the opening direction of the nut discharging port 40d changes, but with this change, the direction of tilt of the bottom plate portion 41 will always face the opening direction of the nut discharging port 40d.

That is, in the nut arranging apparatus 30 according to the example embodiment of the invention, the nut supplying portion 32 is configured to enable the cylindrical portion 40 to rotate around the support shaft 39 that is a shaft that is set in the vertical direction, and changes the direction of tilt of the bottom plate portion 41 to an appropriate direction with the rotation of the cylindrical portion 40. This kind of structure enables the nuts 22 to be dispersed, while being simple in structure with a small number of driving sources.

Also, in the nut arranging apparatus 30 according to the example embodiment of the invention, the bottom plate portion 41 is able to change the direction of tilt to an appropriate direction, by being supported via the universal joint 39a. This kind of structure enables the nuts 22 to be dispersed, while being simple in structure with a small number of driving sources.

The rotating inclined plate 38 is a generally ring-shaped member that rotates around an axis, and is a portion for carrying the nuts arranged on the rotating inclined plate 38 in the rotational direction. Also, as shown in FIG. 13, an inclined surface 38a that is a sloped surface formed so as to slope downward from the inner peripheral side toward the outer peripheral side at a predetermined inclination angle Ob is formed on an upper surface of the rotating inclined plate 38. Therefore, the inclined surface 38a is also a portion used to slide a nut arranged on the inclined surface 38a down toward the radial outside, by a component force, in the direction of tilt, of gravity acting on the nut. That is, a nut arranged on the rotating inclined plate 38 is carried in the rotational direction of the rotating inclined plate 38 while sliding down toward the radial outside of the rotating inclined plate 38.

Also, a hole 38b that is inclined at a predetermined inclination angle θa with respect to the axial direction of the rotating inclined plate 38 is formed inside of the ring-shaped rotating inclined plate 38. The cylindrical portion 40 that is inclined at the predetermined inclination angle θa is externally fixed at the hole 38b. Also at this time, the rotating inclined plate 38 is fixed to the cylindrical portion 40 with the upper end of the inclined surface 38a arranged so as to be no higher than the lower end of the nut discharging port 40d.

With this kind of structure, as the cylindrical portion 40 rotates around the support shaft 39, the rotating inclined plate 38 also rotates around the rotating inclined plate 38, and moreover, nuts that have slid down in the direction of tilt of the bottom plate portion 41 are discharged from the holding portion 37a through the nut discharging port 40d and transferred onto the inclined surface 38a.

Also, sweep-up pins 47 that are first pin members that are provided standing vertically upright for pushing the nuts 22, are provided on an outer peripheral edge portion of the rotating inclined plate 38. Furthermore, a plurality of pushing pins 48 that are second pin members that are provided standing vertically upright for pushing the nuts 22, are provided on a portion to the inside of the outer peripheral edge portion of the rotating inclined plate 38.

Moreover, a retainer plate 51 that is a member for preventing the nuts 22 supplied to the inclined surface 38a of the rotating inclined plate 38 from tumbling is provided above the push pins 48 on the rotating inclined plate 38.

The driving portion 33 is a portion that will serve as a driving source for rotatably driving the cylindrical portion 40 and the rotating inclined plate 38 of the nut supplying portion 32, and includes a motor 42 and a driving pulley 43 and the like, as shown in FIG. 9. The driving pulley 43 is provided on a motor shaft 42a of the motor 42. Also, in the nut supplying portion 32, the cylindrical portion 40 and the rotating inclined plate 38 are supported by the driven pulley 45 that is rotatably supported on the support shaft 39 via the bearing 44.

Also, a belt 46 is wound around the driving pulley 43 and the driven pulley 45. The driven pulley 45 is able to be rotated around the support shaft 39 by rotating the driving pulley 43 with the motor 42.

Also, in the nut supplying portion 32, the cylindrical portion 40 and the rotating inclined plate 38 of the nut supplying portion 32 are fixed to a support portion 45a that is a generally ring-shaped portion provided on an upper portion of the driven pulley 45. Therefore, the cylindrical portion 40 and the rotating inclined plate 38 are able to be rotated around the support shaft 39 with the rotation of the driven pulley 45 around the support shaft 39.

Figure 16:
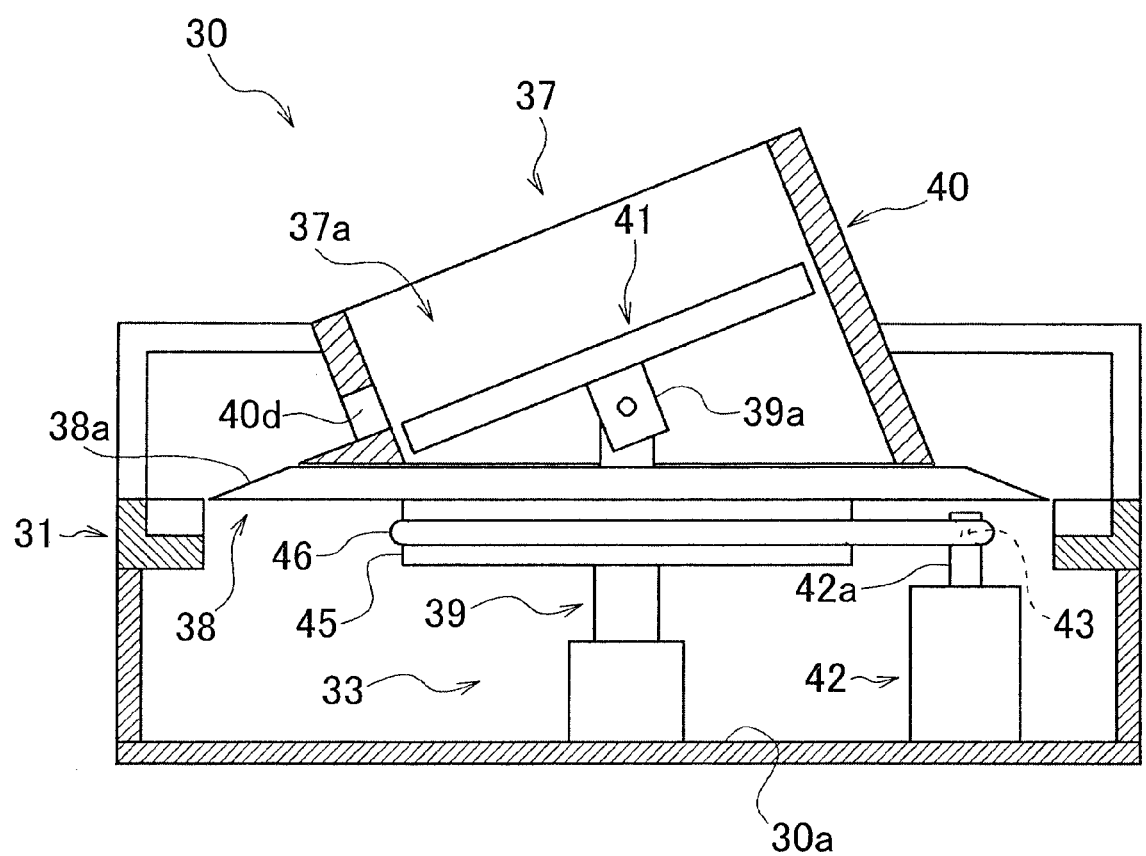
FIG. 16 is a view showing a frame format of a nut arranging apparatus according to a modified example of the one example embodiment of the invention.

In this example embodiment, a nut 22 is supplied by rotating the cylindrical portion 40 by the driving portion 33, and changing, according to the rotation of the cylindrical portion 40, the direction of tilt of the bottom plate portion 41 that is pivotally supported by the universal joint 39a. Alternatively, for example, it is also possible to fix the cylindrical portion 40 to the nut arranging portion 31 or the like, and rotatably drive the rotating inclined plate 38 and the bottom plate portion 41 using the driving portion 33, as in the modified example of this example embodiment shown in FIG. 16. This structure also enables a nut to be supplied to the nut arranging portion 31.

Here, the state of the nut at each portion that forms the nut supplying portion 32 will be described with reference to FIGS. 17 to 24. Hereinafter, a posture of the nut 22 in which a side surface portion 22c of the nut 22 contacts the bottom plate portion 41 will be referred to as a "standing posture", and a posture of the nut 22 in which a front surface portion 22d of the nut 22 contacts the bottom plate portion 41 will be referred to as a "lying posture" (see FIG. 18A).

Figure 17:
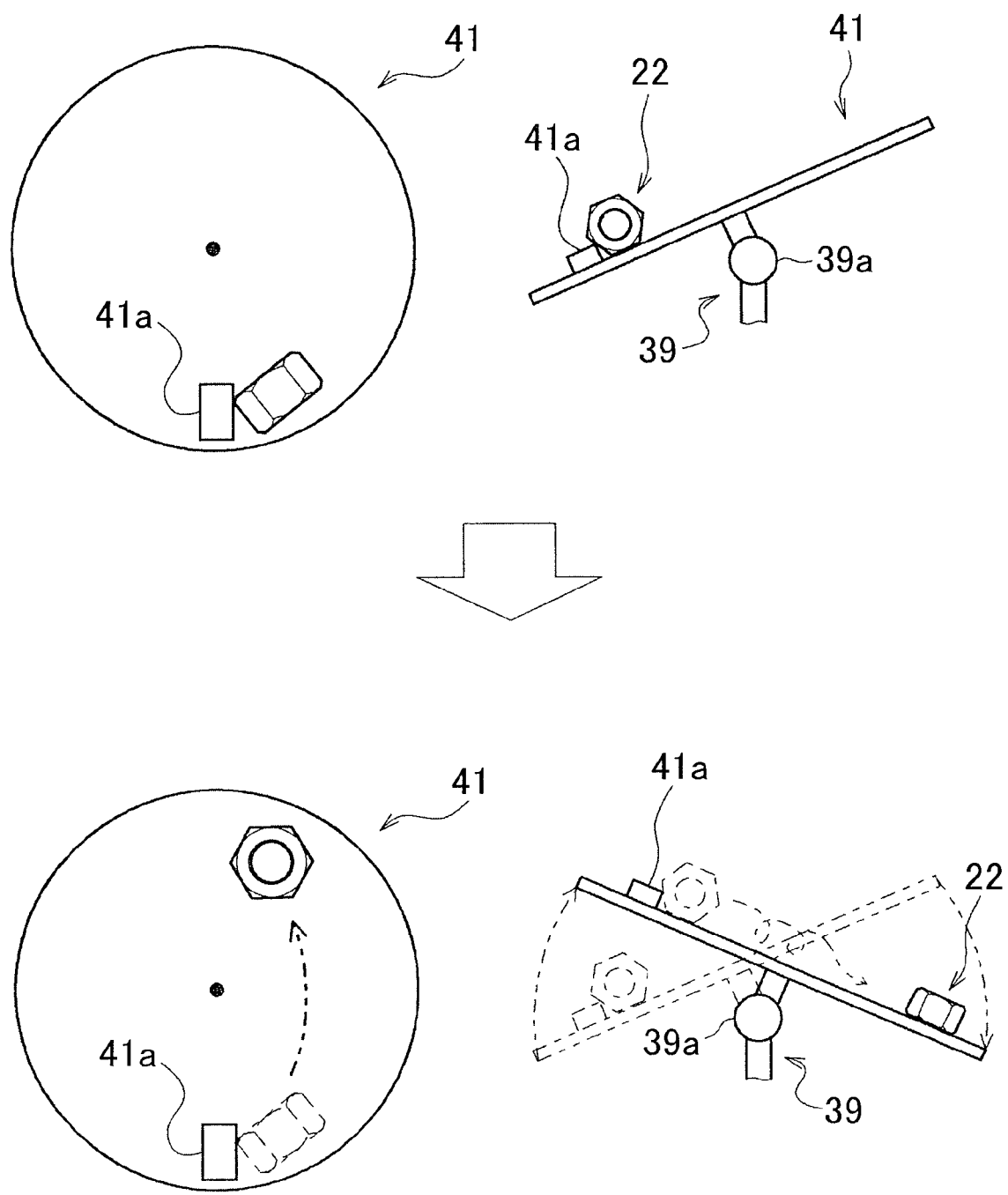
FIG. 17 is a view showing a frame format of a tumbling state of a nut caused by a snaring portion of the bottom plate portion of the example embodiment.

As shown in FIG. 17, the nut 22 is caught on the snaring portion 41a positioned low on the inclined bottom plate portion 41. The snaring portion 41a will soon come to be positioned high on the inclined bottom plate portion 41 as the direction of tilt of the bottom plate portion 41 changes. At this time, the nut 22 that is caught on the snaring portion 41a is lifted up. When this happens, the nut 22 tumbles downward by its own weight, and as it tumbles, the posture of the nut 22 changes. The direction of tilt of the bottom plate portion 41 is continuously changing, so as long as there is a nut 22 that will catch on the snaring portion 41a, the posture of the nut 22 will be repeatedly corrected over and over from a standing posture to a lying posture.

Figure 18A:
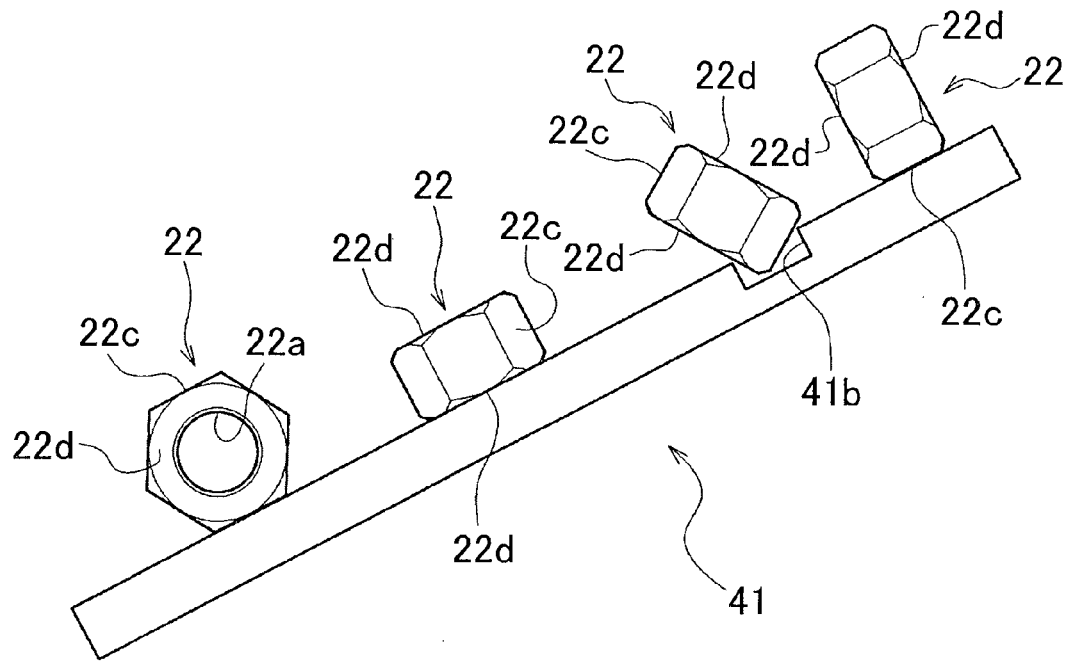
FIG. 18A is both a view showing a frame format of the tumbling state of a nut caused by a groove in the bottom plate portion, and a side sectional view showing a frame format of the tumbling state.

Also, as shown in FIG. 18A, the grooves 41b are formed in the bottom plate portion 41, so the ridge line portion between one front surface portion 22d and one side surface portion 22c of the nut 22 that is in a standing posture will fall into the groove 41b, thus enabling the posture of the nut 22 to be corrected to the lying posture.

Figure 18B:
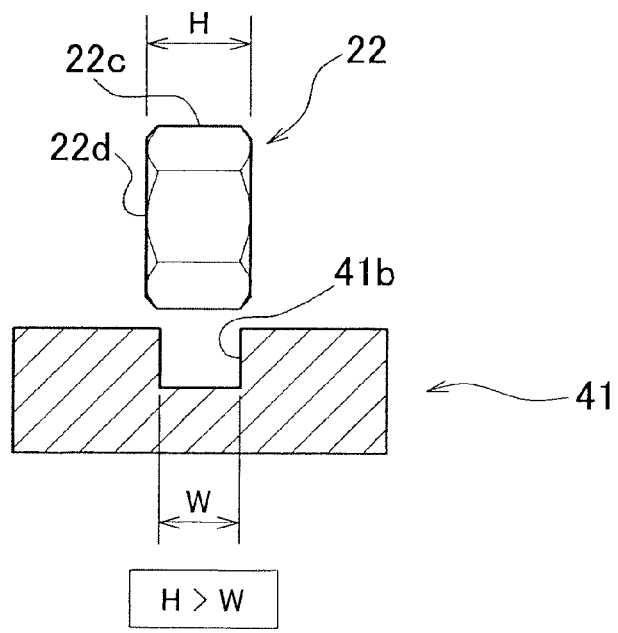
FIG. 18B is a view of the forming width of the groove in the bottom plate portion.

Also, as shown in FIG. 18B, a width dimension W of the grooves 41b (i.e., the dimension of the grooves 41b in the direction of tilt of the bottom plate portion 41) is formed smaller than a height dimension H (i.e., a thickness dimension of the nut 22) of the side surface portion 22c of the nut 22. This prevents the nut 22 from fitting into the grooves 41b while in a standing posture (i.e., prevents the side surface portion 22c of the nut 22 from contacting the bottom surface of the grooves 41b) and being unable to fall over.

That is, in the nut arranging apparatus 30 according to the example embodiment of the invention, the bottom plate portion 41 has both the snaring portions 41a that are protruding portions for engaging the nuts 22 stored in the holding portion 37a, and the grooves 41b that are recessed portions that will cause the nuts 22 stored in the holding portion 37a to fall over. This kind of structure enables the nuts 22 to be reliably corrected to a posture suitable for the nuts to be arranged in the arranging positions (i.e., the arranging positions α1 to α10) (a so-called a lying posture).

Figure 19A:
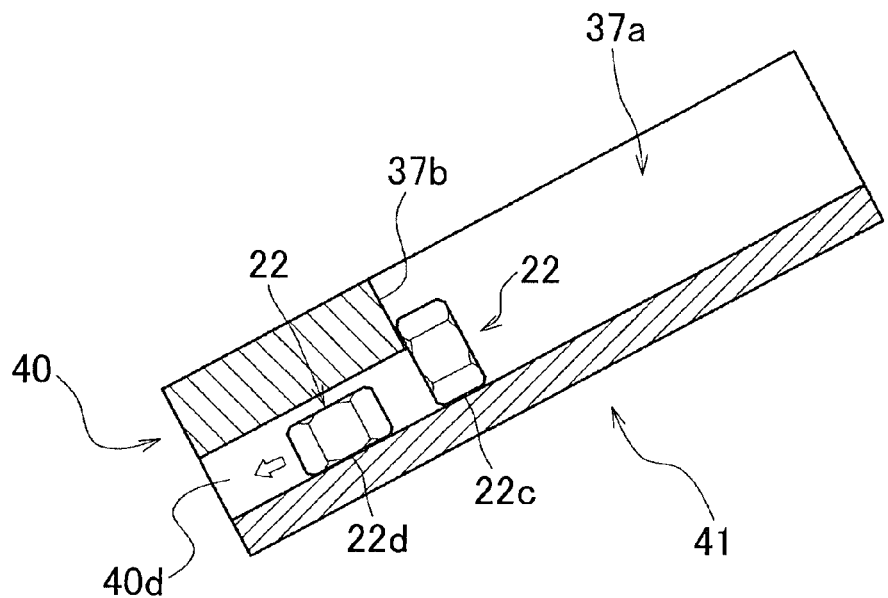
FIG. 19A is both a view showing a frame format of a holding portion provided on the nut supplying portion, and a view showing a frame format of a restricting portion provided in the holding portion.

Also, as shown in FIG. 19A, a restricting portion 37b is provided on the cylindrical portion 40. The dimension of the gap between the restricting portion 37b and the bottom plate portion 41 below the restricting portion 37b is a dimension that is smaller than the dimension L (see FIG. 11B) of the width across flat of the nut 22, and larger than the height of the nut 22. As a result, only nuts 22 in the lying posture are able to pass under the restricting portion 37b.

That is, in the nut arranging apparatus 30 according to the example embodiment of the invention, the restricting portion 37b for engaging a nut 22 in a posture unsuitable for the nut 22 to be supplied to the nut arranging portion 31 (a so-called standing posture), from among the nuts 22 stored in the holding portion 37a, is provided in the holding portion 37a. This kind of structure enables the nuts 22 to be reliably arranged in the arranging positions (i.e., the arranging positions α1 to α10).

Figure 19B:
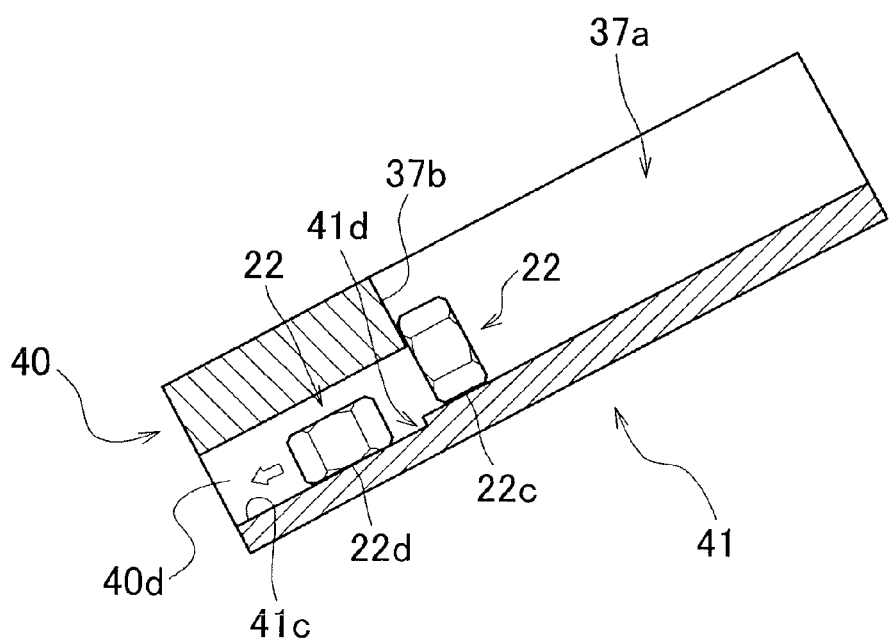
FIG. 19B is a view showing a frame format of a step portion provided in the holding portion.

Also, as shown in FIG. 19B, a step portion 41d in which an outer edge portion 41c of the bottom plate portion 41 that opposes the restricting portion 37b is slightly lower than the portion aside from the outer edge portion, where the snaring portions 41a and the grooves 41b and the like are formed, may be formed on the bottom plate portion 41 that opposes the restricting portion 37b. When the step portion 41d is provided, the nut 22 that has passed under the restricting portion 37b will always fall to the lower side of the step portion 41d (i.e., the outer edge portion 41c), and once the nut 22 that has fallen to the lower side of the step portion 41d (i.e., the outer edge portion 41c), it is unable to pass back through the restricting portion 37b in the reverse direction. As a result, the tumbling portion 37, the nut 22 that has been placed in the proper posture by the restricting portion 37b is discharged from the holding portion 37a (i.e., prevented from returning), so the nut 22 is able to be more reliably corrected to the lying posture.

That is, with the tumbling portion 37, the postures of the plurality of nuts 22 that have been loaded from the loading port 40h into the holding portion 37a is able to be reliably corrected to a posture suitable for the nuts 22 to be supplied to the nut arranging portion 31 (i.e., to a lying posture) by the time that the nuts 22 are discharged from the tumbling portion 37, by action of the bottom plate portion 41, the snaring portions 41a and the grooves 41b of the bottom plate portion 41, and the restricting portion 37b, and the like.

Figure 20:
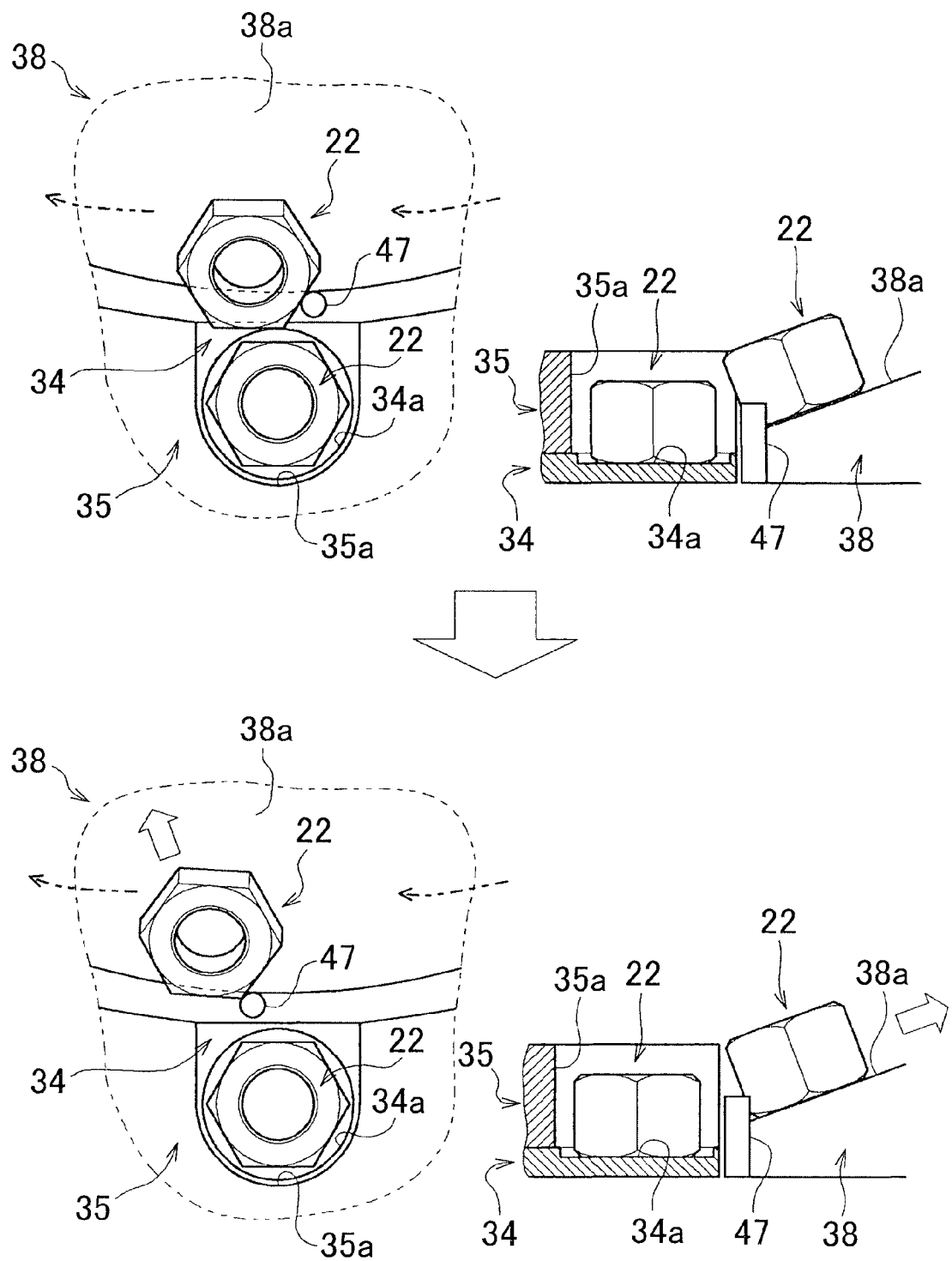
FIG. 20 is both a view showing a frame format of a displacement state of a nut by a sweep-up pin provided on the nut supplying portion, and a view showing a frame format of a state before the nut is swept up and the state after the nut is swept up.

As shown in FIG. 20, the plurality of sweep-up pins 47 that are first pin members are provided on the rotating inclined plate 38 in positions farther to the outside than the outer edge of the rotating inclined plate 38, farther to the inside than the inside diameters of the base member 34 and the guide member 35 of the nut arranging portion 31, and farther to the outside than the diameter of the inscribed circle of the guide plate 36 of the nut arranging portion 31.

Figure 21:
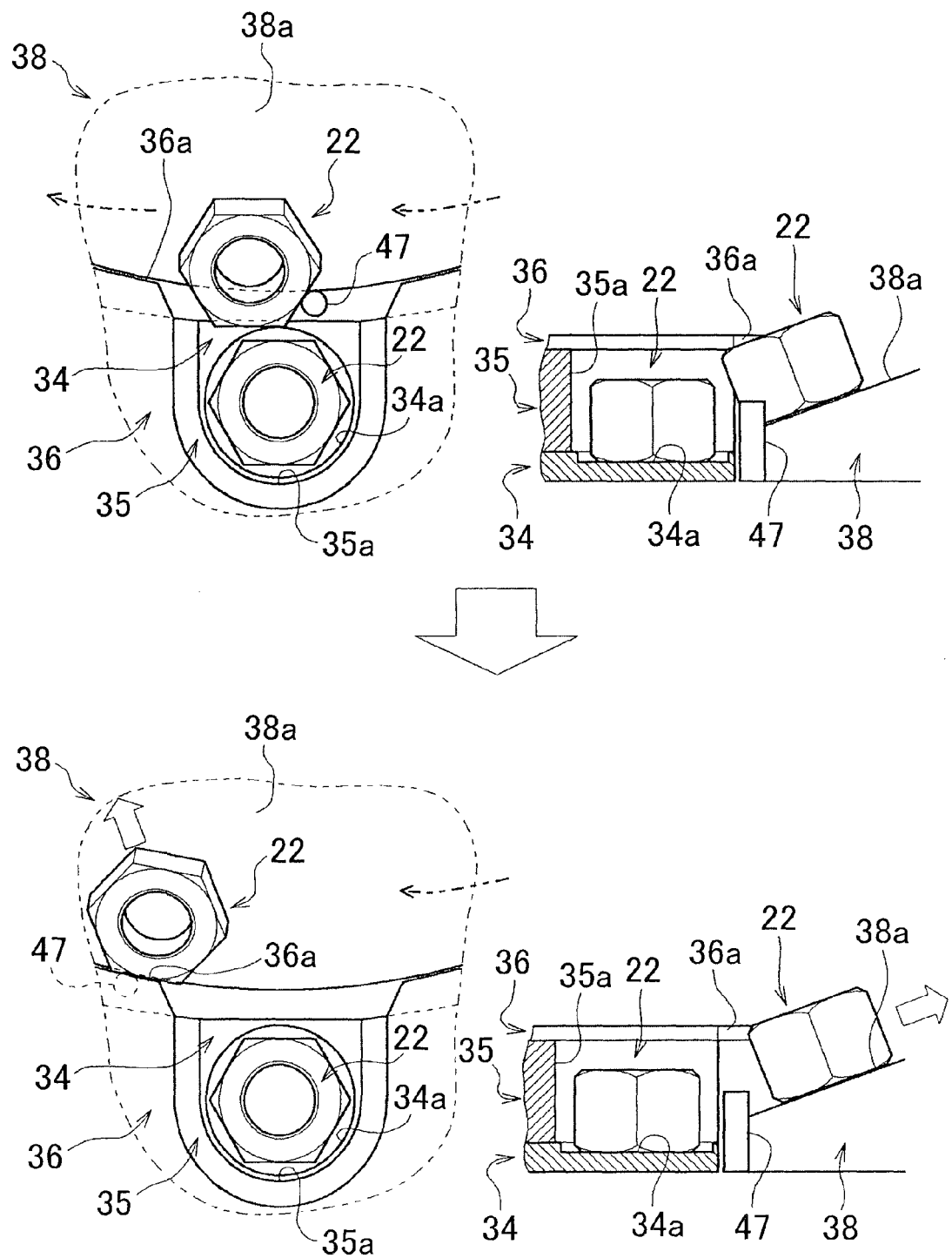
FIG. 21 is both a view showing a frame format of a displacement state of a nut according to an inclined surface provided on a rotating inclined plate that forms part of the nut supplying portion, and a view showing a frame format of a state before the nut abuts against an inclined surface and a state after the nut abuts against the inclined surface.

As shown in FIG. 21, when there is already a nut 22 in a given arranging position α due to the nut 22 moving along the inclined portions 36a, a nut 22 that is waiting near the entrance of that arranging position α, subsequently trying to get into that arranging position α, is led away from that arranging position α.

That is, in the nut arranging apparatus 30 according to the example embodiment of the invention, the nut supplying portion 32 has the inclined surface 38a that is a generally ring-shaped inclined surface that fills the space between the cylindrical portion 40 and the nut arranging portion 31, and the sweep-up pins 47 that are first pin members for pushing the nuts 22 are provided on the outer peripheral edge portion of this inclined surface 38a. This kind of structure enables the nuts 22 to be reliably arranged in the arranging positions (i.e., the arranging positions α1 to α10) corresponding to the arrangement of the socket portions 3.

Figure 22:
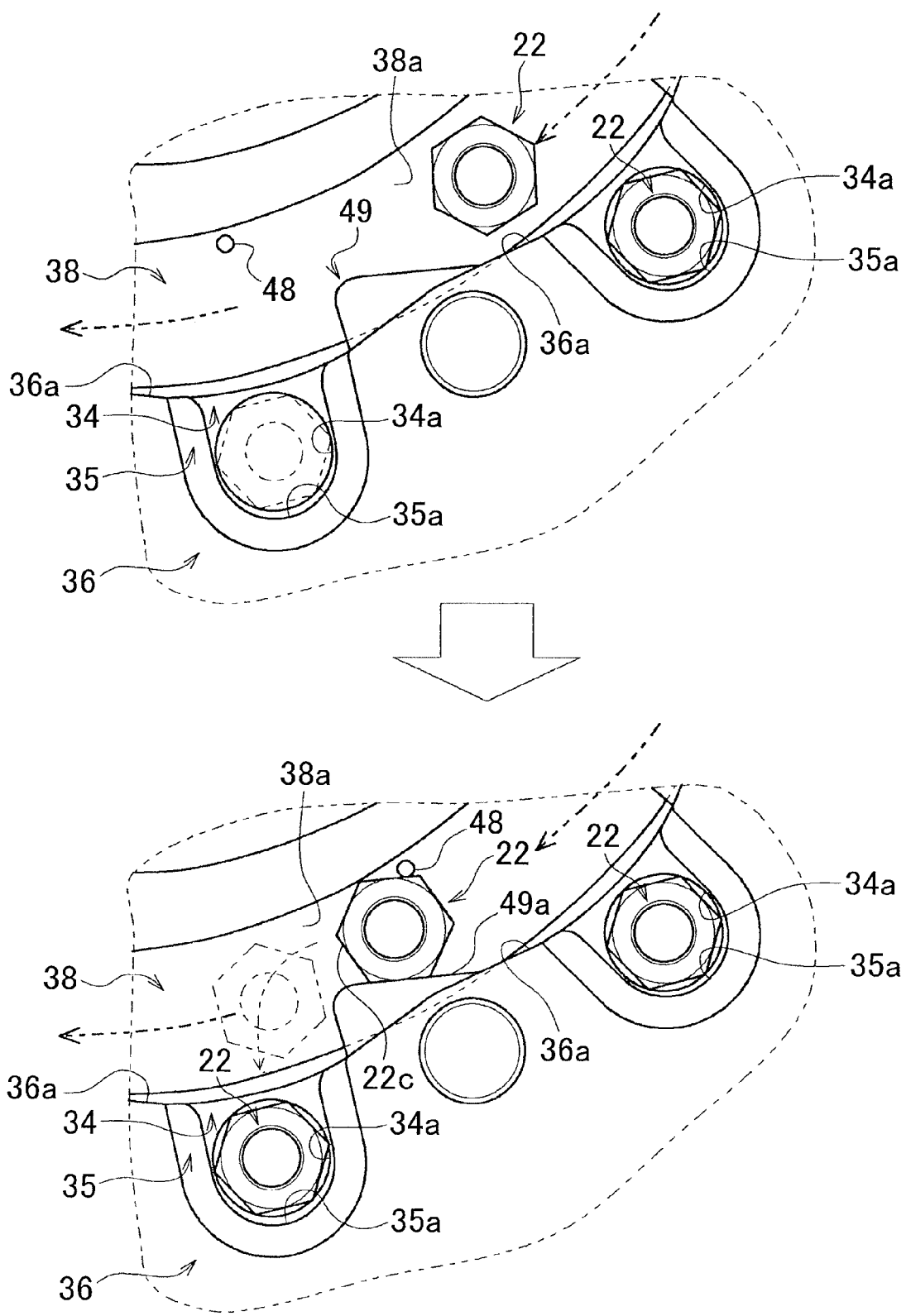
FIG. 22 is both a view showing a frame format of the posture of the nut being corrected, and a view showing a frame format of a state before the nut abuts against a posture correcting portion and a state after the nut abuts against the posture correcting portion.

Furthermore, as shown in FIG. 22, the plurality of pushing pins 48 that are second pin members are provided on the rotating inclined plate 38 in positions farther to the inside than the outer edge of the rotating inclined plate 38. Also, a plurality of posture controlling plates 49 that are posture correcting portions and are portions that bulge out farther to the inside than the outer edge of the rotating inclined plate 38 are provided on the guide plate 36 of the nut arranging portion 31.

A nut 22 placed on the rotating inclined plate 38 is carried in the circumferential direction with the rotation of the rotating inclined plate 38 while gravity acts in the direction of tilt from its own weight. Also, when the nut 22 abuts against a posture controlling plate 49, the nut 22 is corrected to a posture in which the side surface portion 22c follows (i.e., is aligned with) a side portion 49a of the posture controlling plate 49. In this posture, the shape of the posture controlling plate 49 is adjusted to a posture that enables the side surface portion 22c of the nut 22 to be reliably pushed by the push pin 48 that is displaced in the circumferential direction with the rotation of the rotating inclined plate 38.

Also, the nut 22 that has been pushed to the front side of the posture controlling plate 49 in the circumferential direction of rotation of the rotating inclined plate 38 by the push pin 48 slides down the rotating inclined plate 38 toward the radially outer side by the gravity component in the direction of tilt due to its own weight, and falls into the arranging position α that is positioned in front of the posture controlling plate 49 in the circumferential direction of rotation of the rotating inclined plate 38. The shaft of the push pin 48 is covered with a resin tube or the like, so contact with the push pin 48 is elastic. Also, the shaft diameter of the push pin 48 and the friction coefficient between the nut 22 and the push pin 48 are increased, which also enables the pushing operation by the push pin 48 to be more reliable.

That is, in the nut arranging apparatus 30 according to the example embodiment of the invention, the nut supplying portion 32 is provided with the push pins 48 that are second pin members that push the nuts 22, in positions to the inside of the outer peripheral edge portion of the inclined surface 38a. This kind of structure enables the nuts 22 to be reliably fed to the arranging positions (i.e., the arranging positions α1 to α10).

Further, in the nut arranging apparatus 30 according to the example embodiment of the invention, the posture controlling plates 49 that are both portions that are supported by the nut arranging portion 31 and do not rotate with the rotation of the inclined surface 38a, and portions for abutting against the nut 22 in the inclined surface 38a and correcting the postures of the nut 22, are provided on the inclined surface 38a. This kind of structure enables the nuts 22 to be reliably fed to the arranging positions (i.e., the arranging positions α1 to α10).

Figure 23:
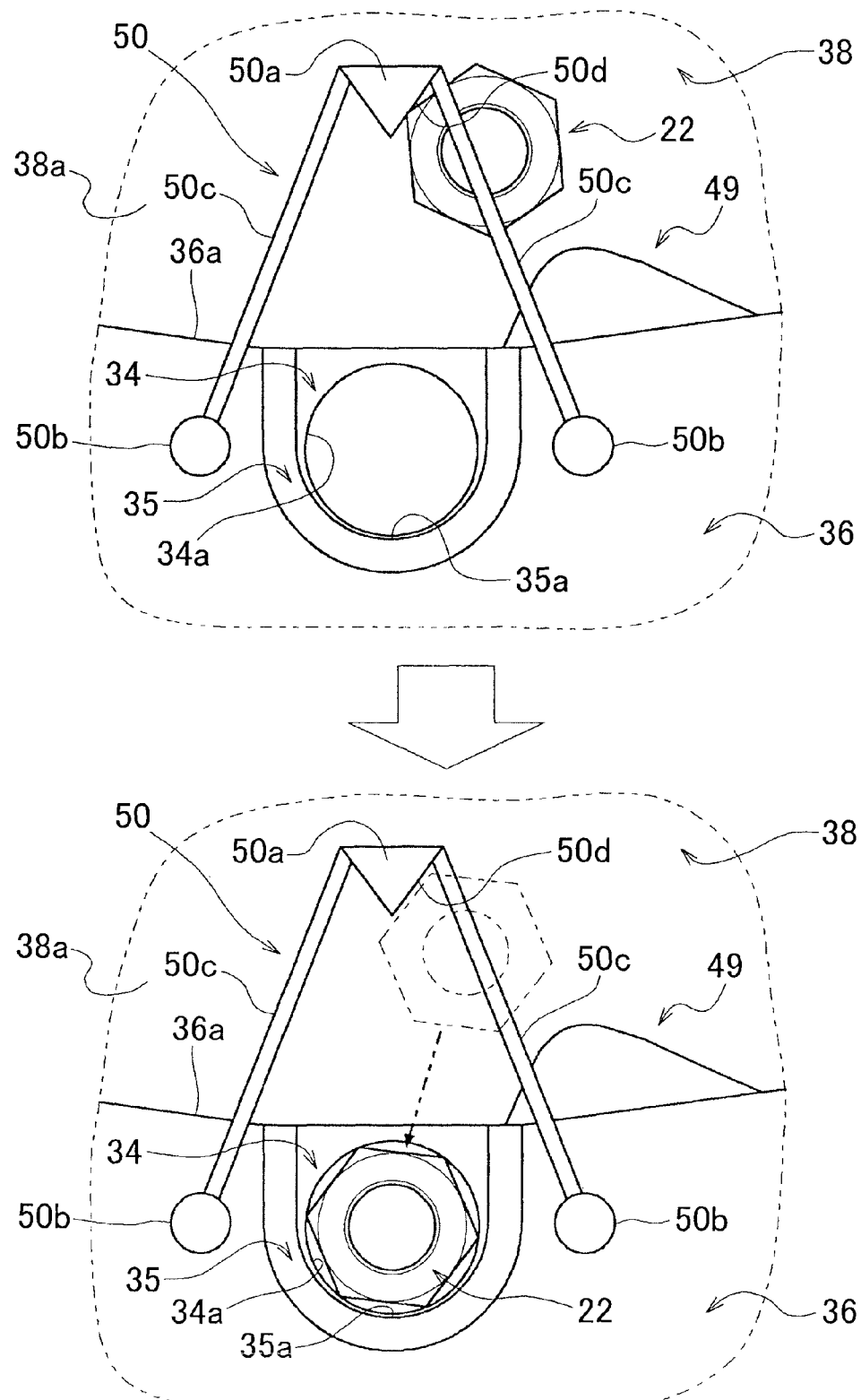
FIG. 23 is both a view showing a frame format of the posture of the nut being corrected, and a view showing a frame format of a state before the nut abuts against an inclined surface of a posture correcting portion and a state after the nut abuts against an inclined surface of the posture correcting portion.

Moreover, as shown in FIG. 23, guide members 50 may also be provided in positions to the inside of the outer edge of the rotating inclined plate 38. The guide members 50 are members for guiding nuts 22 that have been pushed toward the arranging positions α by the push pins 48 to more reliably fall toward the arranging positions α. Each of the guide members 50 is formed by a guide portion 50a, support portions 50b, and arm portions 50c, and the like.

Each guide member 50 is supported by the nut arranging portion 31 that is a non-rotating portion. The arm portions 50c are provided extending toward a position to the inside of the outer edge of the rotating inclined plate 38, by the support portions 50b that are fixed to the nut arranging portion 31. The guide portion 50a is cantilever supported on the tips of the arm portions 50c. An inclined surface 50d of an angle suitable for guiding the nut 22 toward the arranging position α is formed on the guide portion 50a. This kind of structure enables a nut 22 that has been pushed in substantially the circumferential direction of rotation toward the arranging position α by the push pin 48 to be guided in the direction of the arranging position α by the inclined surface 50d of the guide portion 50a so that it can more reliably work its way into the arranging position α.

As a result, a nut 22 that is carried in the circumferential direction around the support shaft 39 against the component force in the direction of tilt of gravity that acts on the nut 22 that is headed in the direction of tilt of the inclined surface 38a of the rotating inclined plate 38, abuts against the inclined portion 36a of the guide, plate 36. As a result, the nut 22 is led to the radial inside of the nut arranging portion 31 against gravity that acts to the radial outside from the component in the direction of tilt that acts on the nut 22 on the inclined surface 38a.

That is, the plurality of nuts 22 that are discharged from the tumbling portion 37 with the proper posture are dispersed by the action of the sweep-up pins 47, the inclined portions 36a, the posture controlling plates 49, and the push pins 48, and the like, which enables the nuts 22 to be reliably arranged one at a time in all of the arranging positions α1 to α10.

Figure 24:
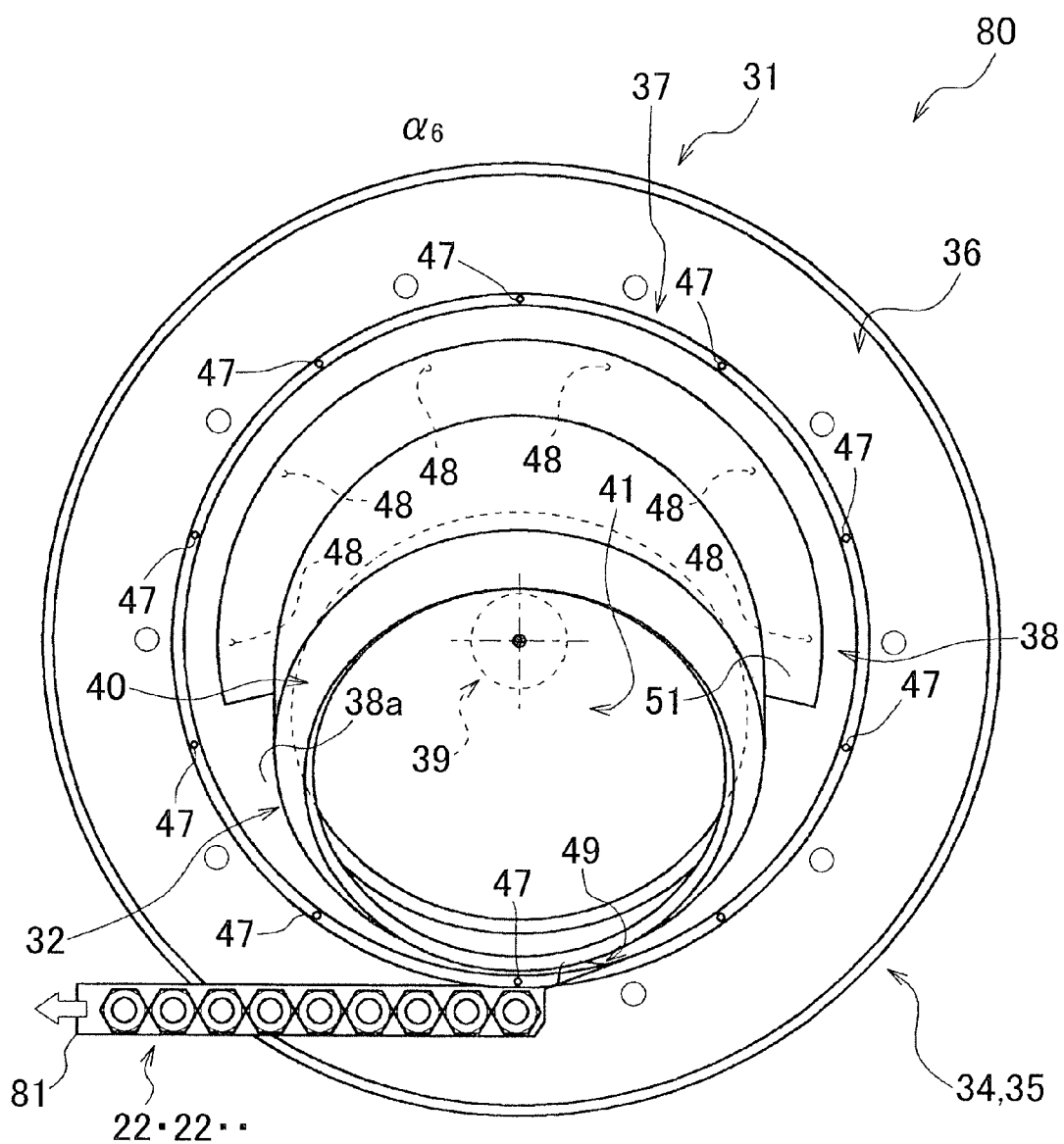
FIG. 24 is a view showing a frame format of a parts finder that uses the nut supplying portion.

A parts finder 80 such as that shown in FIG. 24 may also be formed using the nut supplying portion 32 used in the nut arranging apparatus 30 illustrated in this example embodiment. For example, as shown in FIG. 24, it is possible to provide the parts finder 80 having a simple structure that is able to supply nuts 22 while reliably adjusting the postures of the nuts 22, by connecting a rail member 81 in a position corresponding to the arranging position α.

Next, the arranging state of the nuts using the nut arranging apparatus 30 will be described. First, a plurality of nuts 22 are loaded into the tumbling portion 37 through the loading port 40h (see FIG. 9). In this example embodiment, 10 arranging positions α (i.e., α1 to α10) are set on the nut arranging portion 31 (see FIG. 12), so 10 nuts 22 are loaded. Then the motor 42 is driven and the tumbling portion 37 and the rotating inclined plate 38 are rotated around the support shaft 39 (see FIG. 9).

When this happens, the direction of tilt of the bottom plate portion 41 changes to an appropriate radial direction following the rotation of the tumbling portion 37 (or more specifically, the cylindrical portion 40). At this time, the nuts 22 that are held in the holding portion 37a are tumbled by the action of the snaring portions 41a and the grooves 41b and the like, and corrected to a lying posture (see FIGS. 13, 17, and 18A and 18B).

The nuts 22 that have been corrected to the lying posture pass through the gap between the restricting portion 37b and the outer edge portion 41c while sliding in the direction of tilt of the bottom plate portion 41, and are discharged from the nut discharging port 40d toward the inclined surface 38a of the rotating inclined plate 38 (see FIGS. 9 and 19A and 19B).

The nuts 22 that have been delivered to the inclined surface 38a slide in the direction of tilt of the inclined surface 38a while being carried in the circumferential direction of rotation with the rotation of the rotating inclined plate 38. At this time, the nuts 22 are reliably pushed toward the arranging positions α1 to α10 by the action of the posture controlling plates 49 and the push pins 48 and the like.

Also, a nut 22 that slides toward an arranging position α where a nut 22 is not yet arranged slides into the recessed portion 34a and is arranged in that arranging position α. At this time, the nut 22 is reliably guided so as to fall into the recessed portion 34a by the guide portion 35a and the like.

On the other hand, a nut 22 that has slid toward an arranging position α where a nut 22 is already arranged is unable to get into the recessed portion 34a and thus waits in front of the recessed portion 34a (i.e., near the outer edge portion of the rotating inclined plate 38). This waiting nut 22 is swept up by the sweep-up pin 47 and guided farther to the radial inside of the inclined surface 38a along the inclined portion 36a, where it is again carried in the circumferential direction of rotation by the rotating inclined plate 38 toward the next arranging position α (see FIGS. 20 and 21).

By repeating these operations, the 10 nuts 22 that are supplied are soon arranged one in each of the arranging positions α1 to α10. Then a check is performed to make sure that all of the nuts 22 are arranged in the arranging positions α1 to α10, the motor 42 is stopped, and the series of arranging operations of the nuts 22 by the nut arranging apparatus 30 ends (see FIG. 9).

That is, the nut arranging apparatus 30 according to the example embodiment of the invention includes the nut arranging portion 31 that is a generally ring-shaped portion for arranging the nuts 22, and the nut supplying portion 32 that is a portion for supplying the nuts 22 to the nut arranging portion 31 and is arranged inside of the nut arranging portion 31. The nut supplying portion 32 includes the holding portion 37a that is a portion for temporarily holding the nuts 22. The nut supplying portion 32 is configured to form the bottom plate portion 41 that is the bottom surface portion of the holding portion 37a with a surface that is inclined with respect to the horizontal direction, and be able to change the direction of tilt of the bottom plate portion 41 to an appropriate radial direction. The nut supplying portion 32 supplies a nut 22 to an appropriate position of the nut arranging portion 31 by sliding a nut 22, held in the holding portion 37a in the direction of tilt of the bottom plate portion 41, while changing the direction of tilt of the bottom plate portion 41 to an appropriate radial direction. This kind of structure makes it possible to realize, with a simple structure, the nut arranging apparatus 30 capable of arranging the nuts 22 corresponding to the socket portions 3 of the multi-axis temporary tightening tool 1.

Also, in the nut arranging apparatus 30 according to the example embodiment of the invention, the holding portion 37a includes the cylindrical portion 40 that is a generally cylindrical portion that is inclined with respect to the vertical direction and blocks off a lower end portion with the bottom plate portion 41, the nut discharging port 40d that is an open portion for discharging the nuts 22 from the holding portion 37a, and is formed the lower end portion of the cylindrical portion 40, and the inclined surface 38a that is a generally ring-shaped inclined portion that is a surface that is inclined with respect to the horizontal direction and is continuous from the outside of the cylindrical portion 40 to just before the nut arranging portion 31. The holding portion 37a is configured such that a nut 22 held in the holding portion 37a slides in the direction of tilt of the bottom plate portion 41 while the direction of tilt of the bottom plate portion 41 is changed to an appropriate direction. The nut 22 held in the holding portion 37a is consequently discharged toward the inclined surface 38a from the nut discharging port 40d positioned on the low side in the direction of tilt of the bottom plate portion 41. The nut 22 then slides on the inclined surface 38a and is supplied to an appropriate position of the nut arranging portion 31. This kind of structure enables a nut arranging apparatus capable of arranging nuts 22 corresponding to the socket portions 3 of the multi-axis temporary tightening tool 1 to be realized by a simple structure.

Figure 25:
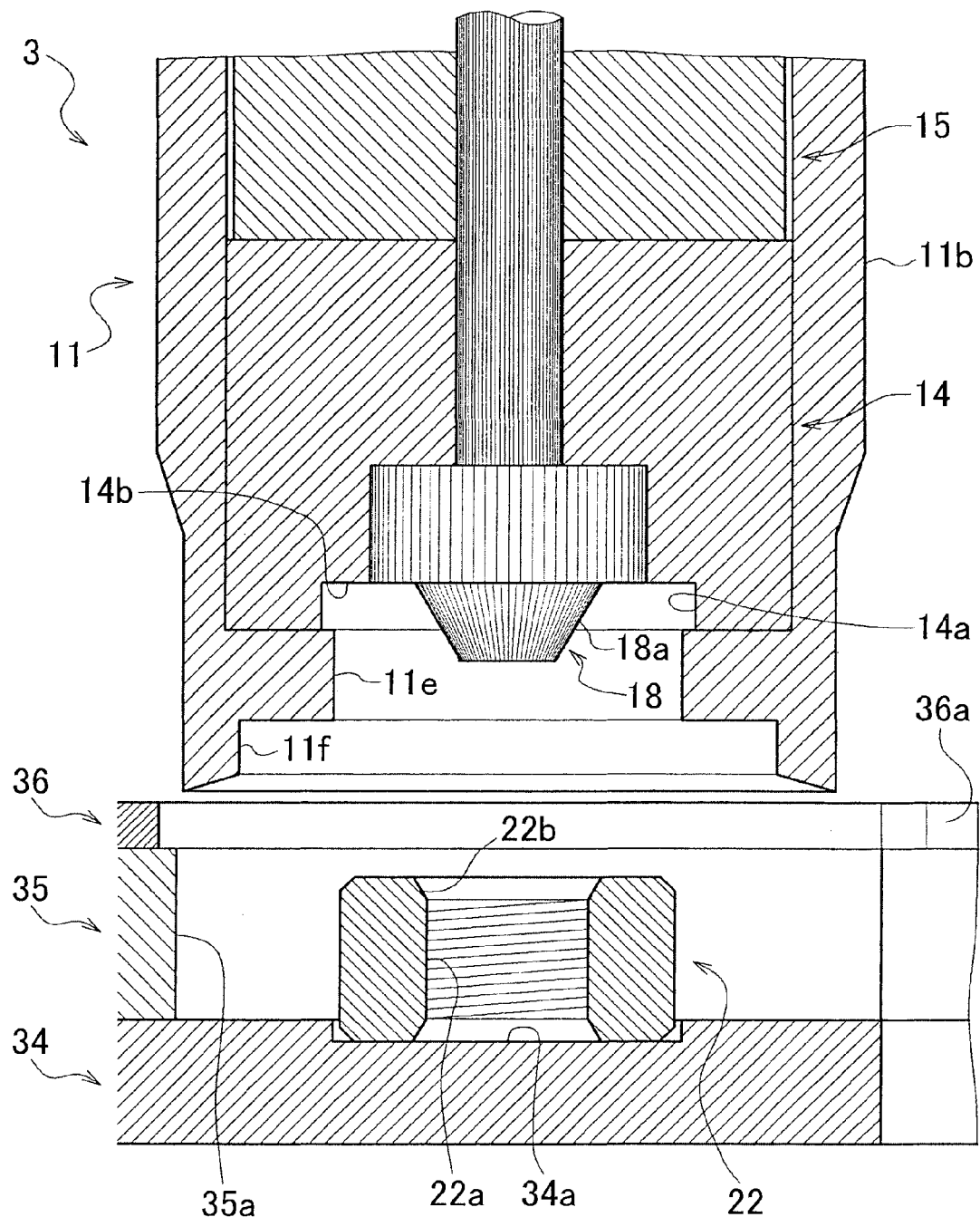
FIG. 25 is a view showing a frame format of a state in which a nut is loaded in a multi-axis temporary tightening tool that uses the nut arranging apparatus (i.e., a state in which a multi-axis temporary tightening tool is provided)

Next, the loading state of the nuts in the multi-axis temporary tightening tool 1 that uses the nut arranging apparatus 30 will be described with reference to FIGS. 25 to 28. When the nuts 22 are loaded into the socket portions 3 of the multi-axis temporary tightening tool 1 using the nut arranging apparatus 30, first the nut arranging apparatus 30 is operated and nuts 22 are arranged in the arranging positions α1 to α10 (see FIG. 10). Then the multi-axis temporary tightening tool 1 is arranged such that a socket portion 3 is positioned directly above an arranging position α, as shown in FIG. 25.

Figure 26:
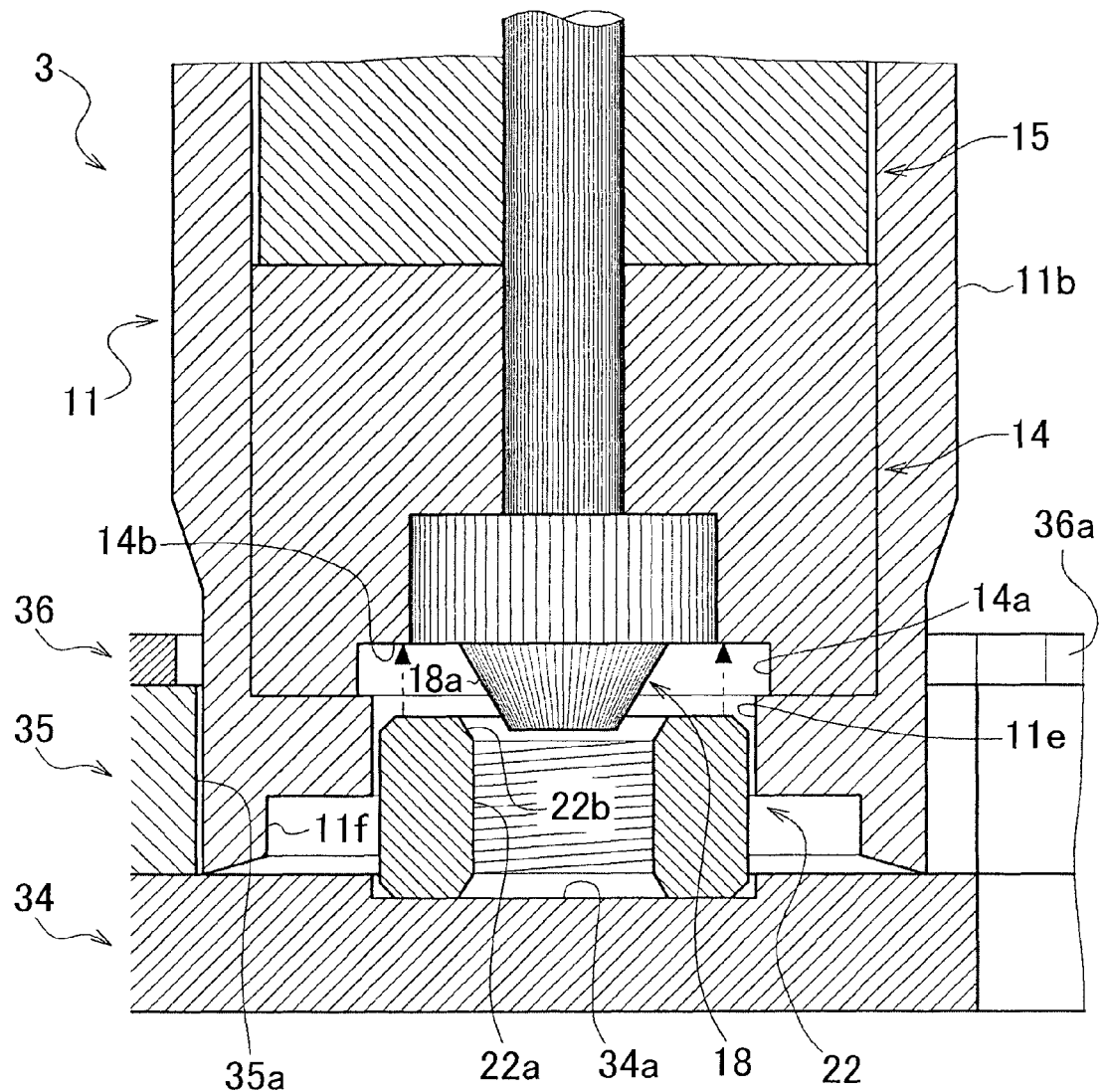
FIG. 26 is a view showing a frame format of a state in which a nut is loaded (i.e., when a nut is being loaded) in the multi-axis temporary tightening tool that uses the nut arranging apparatus.

Next, the multi-axis temporary tightening tool 1 is lowered and the socket portion 3 is positioned by the guide member 35 of the nut arranging portion 31, as shown in FIG. 26. At this time, the nut 22 arranged in the arranging position α is housed near a reduced diameter portion 11e inside of the socket portion 3, and magnetic force from the engaging portion 14 acts on the nut 22.

Figure 27:
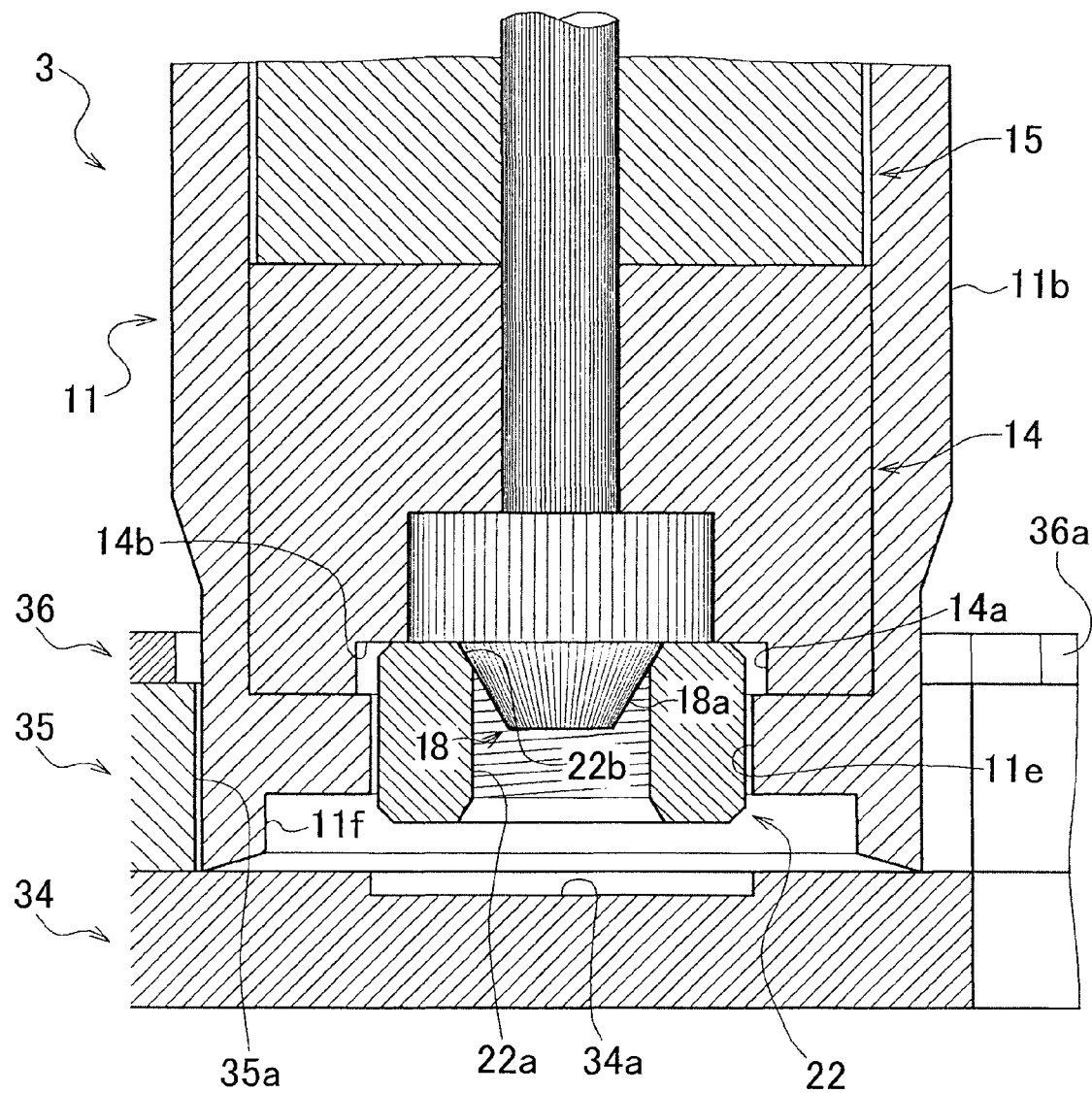
FIG. 27 is a view showing a frame format of a state in which a nut is loaded (i.e., after a nut is loaded) in the multi-axis temporary tightening tool that uses the nut arranging apparatus.

Then the nut 22 is attracted such that the front surface portion 22d of the nut 22 contacts a lower portion 14b of the engaging portion 14, as shown in FIG. 27, by the magnetic force acting on the engaging portion 14. In this way, the nut 22 is loaded in a predetermined position inside the socket portion 3. That is, using the nut arranging apparatus 30, a plurality of nuts 22 are able to be simultaneously loaded into sockets 3 by positioning and placing the multi-axis temporary tightening tool 1 on the nut arranging apparatus 30 with nuts 22 arranged in the arranging positions α1 to α10.

Figure 28:
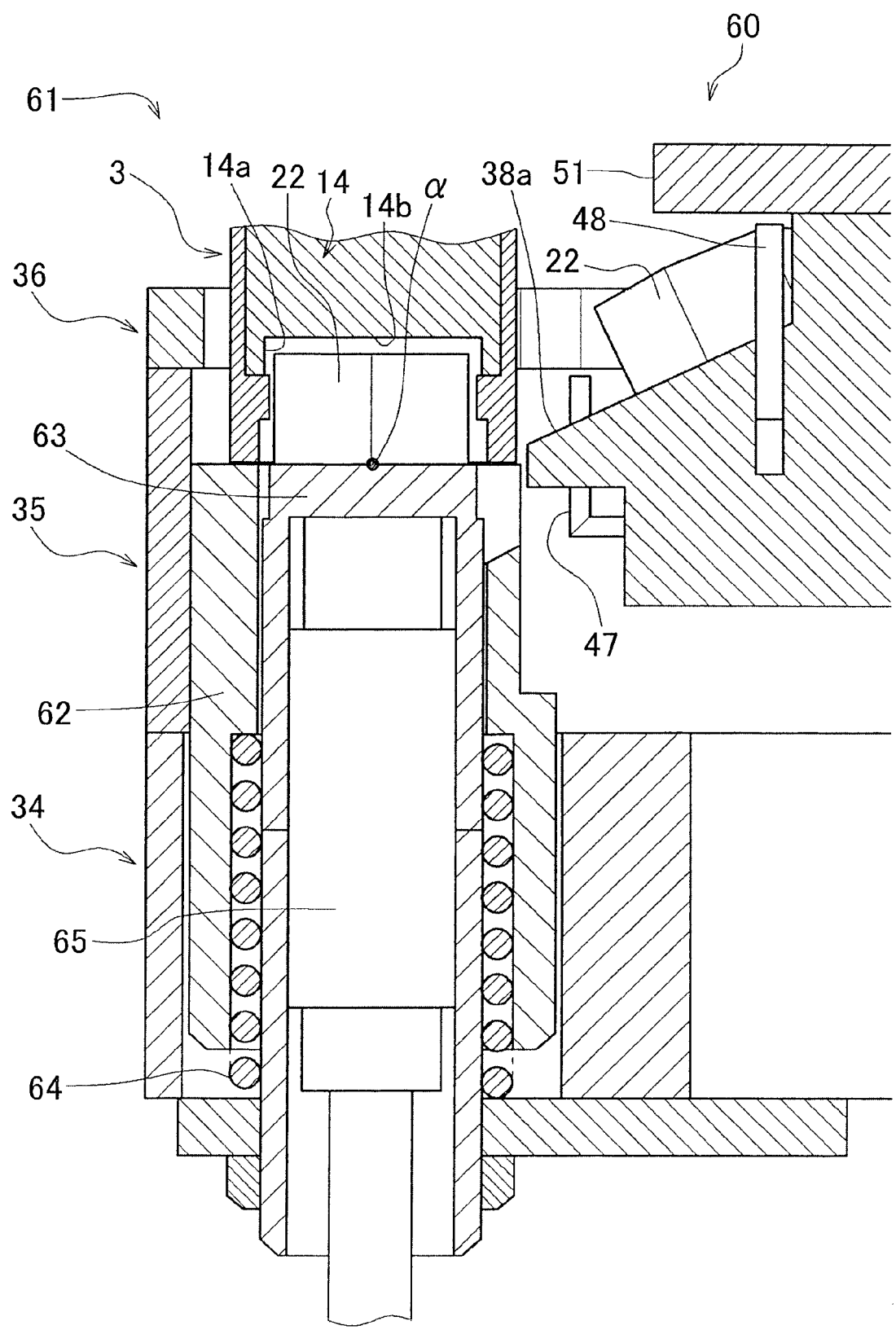
FIG. 28 is a view showing a frame format of a state in which a nut is loaded (i.e., when a nut is being loaded) in the multi-axis temporary tightening tool that uses the nut arranging apparatus.

Also, with the nut arranging apparatus 60 provided with the nut arranging portion 61 of the other example embodiment shown in FIG. 15, for example, the positioning member 62 can be pushed downward by the socket portion 3 in the operation to lower the multi-axis temporary tightening tool 1 toward the nut arranging apparatus 60, as shown in FIG. 28, and as a result, the positioning member 62 can be displaced downward.

Displacing the positioning member 62 downward in this way makes it possible for the lower portion 14b of the engaging portion 14 to be brought closer to the nut 22 on the bottom surface member 63. In addition, the nut 22 can be attracted to the engaging portion 14 while being kept parallel and aligned with the inner peripheral surface of the positioning member 62. As a result, the orientation (i.e., the axial direction) of the nut 22 can be prevented from changing when the nut 22 is attracted by the engaging portion 14, thus enabling the nut 22 to be more reliably loaded into the engaging portion 14 in a predetermined posture.

The invention claimed is:

1. A nut arranging apparatus comprising:
a nut arranging portion configured to arrange nuts, the nut arranging portion having a generally ring-shaped shape; and
a nut supplying portion configured to supply the nuts to the nut arranging portion, the nut supplying portion being arranged inside the nut arranging portion, the nut supplying portion including a holding portion configured to temporarily hold the nuts, the nut supplying portion being configured to provide a bottom surface portion of the holding portion with a surface inclined with respect to a horizontal direction, the nut supplying portion being configured to change a direction of tilt of the bottom surface portion to an appropriate radial direction; and
the nut supplying portion being configured to supply the nuts to an appropriate position of the nut arranging portion by sliding the nuts held in the holding portion in the direction of tilt of the bottom surface portion while changing the direction of tilt of the bottom surface portion to an appropriate radial direction,
wherein the nut arranging portion has a plurality of recessed portions housing the nuts, the plurality of recessed portions being provided in an arrangement corresponding to predetermined positions, in order to arrange the nuts in the predetermined positions,
wherein the nut supplying portion is configured such that a cylindrical portion rotates around an axis set in the vertical direction; and
the nut supplying portion is configured to change the direction of tilt of the bottom surface portion to an appropriate direction with the rotation of the cylindrical portion.

2. The nut arranging apparatus according to claim 1, wherein the holding portion includes a cylindrical portion, a nut discharging port, and a generally ring-shaped inclined portion,
the cylindrical portion being a generally cylindrical portion inclined with respect to a vertical direction, in the holding portion a lower end portion of the cylindrical portion being blocked off by the bottom surface portion,
the nut discharging port being an open portion for discharging the nuts from the holding portion, the nut discharging port being in the lower end portion of the cylindrical portion,
the generally ring-shaped inclined portion providing a surface that is inclined with respect to a horizontal direction and is continuous from the outside of the cylindrical portion to just before the nut arranging portion, and
the holding portion being configured to supply the nuts to the appropriate position of the nut arranging portion by discharging the nuts held in the holding portion in the appropriate radial direction from the nut discharging port toward the inclined portion by sliding the nuts held in the holding portion in the direction of tilt of the bottom surface portion while changing the direction of tilt of the bottom surface portion to the appropriate radial direction, and then sliding the nuts on the inclined portion.

3. The nut arranging apparatus according to claim 1, wherein a groove positioning the nuts is provided in a bottom portion of the recessed portions.

4. The nut arranging apparatus according to claim 3, wherein the bottom surface portion is configured to change the direction of tilt to an appropriate direction by being supported via a universal joint.

5. The nut arranging apparatus according to claim 1, wherein the bottom surface portion includes a protruding portion and a groove, the protruding portion configured to retain the nuts held in the holding portion, the groove configured to cause the nuts held in the holding portion to fall over.

6. The nut arranging apparatus according to claim 5, wherein a width dimension of the groove is smaller than a height dimension of a side surface portion of the nuts.

7. The nut arranging apparatus according to claim 5, wherein the holding portion includes a restricting portion at the nut discharging port, and the restricting portion is configured to allow only the nuts in a predetermined posture to pass through.

8. The nut arranging apparatus according to claim 7, wherein an interval between a bottom surface of the restricting portion and an upper surface of the bottom surface portion of the holding portion is larger than a height dimension of a side surface portion of the nuts and smaller than a width across flat dimension of the nuts.

9. The nut arranging apparatus according to claim 7, wherein a step portion is provided at an outer edge portion of the lower surface portion that opposes the restricting portion, the step portion becoming slightly lower than a portion other than the outer edge portion.

10. The nut arranging apparatus according to claim 1, wherein the nut supplying portion includes a first pin member for pushing the nuts, on an outer peripheral edge portion of an inclined portion.

11. The nut arranging apparatus according to claim 10, wherein the nut supplying portion includes a second pin member for pushing the nuts, in a position farther toward a radial inside than the outer peripheral edge portion of the inclined portion.

12. The nut arranging apparatus according to claim 10, wherein a posture controlling plate is provided on the inclined portion, the posture controlling plate being supported by the nut arranging portion, the posture controlling plate not rotating with rotation of the inclined portion, and the posture controlling plate abutting against the nuts on the inclined portion to correct a posture of the nuts.

* * * * *